(12) United States Patent
Mohebi et al.

(10) Patent No.: US 12,367,370 B2
(45) Date of Patent: Jul. 22, 2025

(54) SYSTEMS AND METHODS FOR TRACKING FACILITY ASSETS

(71) Applicant: ARGUS CONSULTING, INC., Overland Park, KS (US)

(72) Inventors: Meraj Mohebi, Houston, TX (US); Kevin Peck, Overland Park, KS (US)

(73) Assignee: ARGUS CONSULTING, INC., Overland Park, KS (US)

( * ) Notice: Subject to any disclaimer, the term of this patent is extended or adjusted under 35 U.S.C. 154(b) by 0 days.

(21) Appl. No.: 17/721,627

(22) Filed: Apr. 15, 2022

(65) Prior Publication Data

US 2023/0334280 A1 Oct. 19, 2023

(51) Int. Cl.
| G06K 19/077 | (2006.01) |
| G06K 19/07 | (2006.01) |
| G06Q 10/08 | (2024.01) |
| H04W 4/029 | (2018.01) |

(52) U.S. Cl.
CPC ... *G06K 19/07758* (2013.01); *G06K 19/0723* (2013.01); *G06Q 10/08* (2013.01); *H04W 4/029* (2018.02)

(58) Field of Classification Search
CPC .............................................. G06K 19/07758
See application file for complete search history.

(56) References Cited

U.S. PATENT DOCUMENTS

| 6,144,301 A | 11/2000 | Frieden | |
| 6,832,199 B1* | 12/2004 | Kucek | A61B 5/0002 |
| | | | 709/219 |
| 2004/0074974 A1* | 4/2004 | Senba | G06K 19/07728 |
| | | | 343/866 |
| 2005/0092825 A1* | 5/2005 | Cox | G06K 7/0008 |
| | | | 700/214 |
| 2006/0065730 A1* | 3/2006 | Quan | G06F 8/65 |
| | | | 235/451 |
| 2007/0210923 A1 | 9/2007 | Butler et al. | |
| 2008/0201388 A1* | 8/2008 | Wood | G06Q 10/06 |
| | | | 707/999.203 |

(Continued)

OTHER PUBLICATIONS

International Search Report and Written Opinion for International Application No. PCT/US2023/017390 dated Jul. 5, 2023 (10 pages).

*Primary Examiner* — Joseph H Feild
*Assistant Examiner* — Pameshanand Mahase
(74) *Attorney, Agent, or Firm* — Polsinelli PC

(57) ABSTRACT

Systems and methods include an asset tracking platform for tracking, analyzing, and managing facility assets at an operational facility site. The asset tracking platform includes a site operator device in local communication with a field device. The facility assets are assigned to physical asset tags using an assignment procedure that includes scanning the physical asset tag with the field device (e.g., using a radio-frequency identifier (RFID) sensor) to associate an identifier of the physical asset tag with asset data (e.g., location data, an asset identifier, an asset type, etc.). The field device downloads an asset task list using the local communication to represent a list of daily tasks to be completed with the field device. Task execution procedures are performed for the list of daily tasks by scanning the physical asset tag with the field device which starts a timer. Task completion data is synced with the site operator device.

20 Claims, 16 Drawing Sheets

(56) References Cited

U.S. PATENT DOCUMENTS

| | | | |
|---|---|---|---|
| 2010/0065632 A1* | 3/2010 | Babcock | G06Q 50/28 |
| | | | 705/28 |
| 2013/0321131 A1 | 12/2013 | Tucker et al. | |
| 2020/0364525 A1* | 11/2020 | Mats | H04W 4/70 |
| 2022/0001549 A1 | 1/2022 | Vadayadiyil Raveendran et al. | |
| 2023/0046835 A1* | 2/2023 | Kobel | B66F 11/042 |

* cited by examiner

SYSTEMS AND METHODS FOR TRACKING FACILITY ASSETS

FIELD

Aspects of the present disclosure generally relate to systems and methods for tracking facility assets and more particularly to tracking facility assets using a facility asset tracking platform.

BACKGROUND

Industrial facilities typically operate dozens of different types of facility assets or equipment with various operational and maintenance requirements. Substantial investments are made to monitor the equipment and perform ongoing maintenance to prevent equipment failures, downtime, and lost revenue. For instance, maintenance personnel are tasked with daily monitoring or maintenance tasks to confirm that all of the different equipment types at the facility are operating correctly and being inspected according to industry standards. The maintenance personnel travel between the different equipment locations at the industrial facility throughout the workday to perform physical inspections of the equipment. In large industrial facilities, this process can take hundreds of hours of labor as teams of maintenance people perform hundreds of different maintenance tasks for a variety of equipment types each day.

Accordingly, performing equipment monitoring and maintenance at industrial facilities incurs significant costs. The cost can be difficult to quantify and opportunities for improvement difficult to identify due to the manual nature of the physical inspections. Additionally, the tools for tracking work hours are often manipulated or deceived by the employees that the tools are intended to measure, limiting the accuracy of the physical inspection reports and the ability to make actionable decisions based on the reports. Moreover, many industrial facilities are located in remote locations without reliable internet connectivity throughout the facility, further impinging the effectiveness of deploying facility maintenance tools.

It is with these observations in mind, among others, that various aspects of the present disclosure were conceived and developed.

SUMMARY

Implementations described and claimed herein address the foregoing problems by providing systems and methods to track facility assets. The method can include assigning one or more physical asset tags to one or more facility assets at an operational facility site; receiving, at a field device of an asset tracking platform, a download of an asset task list (e.g., representing a subgroup of the one or more facility assets at the operational facility); and/or performing a task execution procedure corresponding to a task entry of the asset task list. The task execution procedure can include scanning a physical asset tag of the one or more physical asset tags. Performing the task execution procedure can also generating task completion data associated with completing the task entry and/or the corresponding facility asset. The method can also include uploading the task completion data from the field device to a site operator device at the operational facility site, for instance, via a data sync that uses a local connection (e.g., not internet-based) between the field device and the site operator device.

In some examples, the one or more physical asset tags include a plurality of visually uniform plastic tags. For instance, the one or more physical asset tags can store one or more unique alphanumeric values using radio-frequency identification (RFID) to identify the one or more facility assets, which can omit other external physical markings on the physical asset tags. Furthermore, assigning the one or more physical asset tags to the one or more facility assets can include generating and storing, using the field device, an association between the one or more unique alphanumeric values and location data of the field device. For instance, the system can determine current location data of the field device (e.g., global positioning satellite (GPS) data) at the moment of scanning the physical asst tag and can associate this current location data with the physical asset tag to assign the current location data to the facility asset represented by the physical asset tag. The method can further include causing a task map corresponding to the asset task list to be presented at the field device with one or more indicators representing the one or more physical asset tags (e.g., by using the location data associated with the unique alphanumeric value corresponding to the physical asset tag).

In some instance, uploading the task completion data from the field device to the site operator device includes establishing a local area connection between the field device and the site operator device that omits reliance on an internet connection (e.g., a Wi-Fi connection, a Bluetooth connection, a two-way radio frequency connection, an ethernet connection, or the like). The method can further include generating a work order for an unplanned task using the field device. In some scenarios, the task entry is a first task entry of the asset task list; and the method further includes adding a second task entry to the asset task list for the unplanned task of the work order. Moreover, uploading the task completion data can include uploading the second task entry (e.g., corresponding to the work order) to a site operator task list at the site operator device, for instance, during a sync procedure between the field device and the site operator device. Additionally or alternatively, the task entry can have an open status in the download of the asset task list; the open status can be changed to a closed status at the field device in respond to performing the task execution procedure; and uploading the task completion data can cause the open status to change to the closed status for the task entry at the site operator device. In other words, both the site operator device and the field device can maintain separate asset task lists that can be synced to cause any status changes generated at the field device to be replicated at the site operator device. Furthermore, in addition to syncing data between the field device and the site operator device locally, the method can include receiving a user input at the site operator device instructing the site operator device to upload the task completion data; and in response to the user input, uploading the task completion data from the site operator device to a remote server located away from the operational facility site. The remote server can store an additional or master operational site task list that is updated from and downloaded to the operational site device. The master operational site task list can be updated from the operational site device to reflect changes made to complete the tasks and can be downloaded to the operational site device to provide a list of tasks to be completed. For instance, the asset task list can include a plurality of task entries with statuses of open, closed, or in-progress. Additionally or alternatively, the method can further include generating a task dashboard at the field device representing the plurality of task entries with the statuses of open, closed, or in-progress.

In some examples, a device for tracking facility assets includes one or more sensors; a processor; and a memory storing computer-readable instructions that, when executed by the processor, cause the device to perform one or more operations. The one or more operations can include generating an assignment of a physical asset tag to a facility asset at an operational facility site using the one or more sensors (e.g., RFID sensors); receiving a download of an asset task list including one or more asset task entries; performing one or more task execution procedures corresponding to the one or more asset task entries to generate task completion data; and/or uploading the task completion data to a site operator device. Furthermore, the one or more task execution procedures can include a first option to scan the physical asset tag; and a second option to omit scanning the physical asset tag in response to a manual override input.

In some instances, the computer-readable instructions, when executed by the processor, can further cause the device to receive the manual override input; and include an indication of the manual override input (e.g., a red flag) in the task completion data uploaded to the site operator device. The device can generate the assignment of the physical asset tag to the facility asset by associating a tag identifier of the physical asset tag with location data of the device (e.g., at a time of scanning the physical asset tag), such that the location data of the device is stored as a representation of a facility asset location, which can be presented on an asset map. Furthermore, performing the one or more task execution procedures can include starting a timer at the device and stopping the timer at the device to create a task time associated with the task completion data. Additionally or alternatively, performing the one or more task execution procedures can include creating a text file, an audio file, or an image file using the one or more sensors; and including the text file, the audio file or the image file in the task completion data uploaded to the site operator device.

In some examples, the device(s) for tracking facility assets includes one or more processor; and one or more memory storing computer-readable instructions that, when executed by the one or more processor, cause the device(s) to perform one or more operations. The device(s) can be the site operator device and/or the one or more operations can include receiving, via a download from a remote service, a site operator task list including a plurality of asset task entries for facility assets represented by physical asset tag identifiers; sending, to a field device, an asset task list including one or more asset task entries of the plurality of asset task entries; and/or receiving, from the field device, task completion data representing one or more task execution procedures performed for the one or more asset task entries of the asset task list sent to the field device. By way of examples, the one or more asset task entries of the asset task list can have an open status and/or a task completion deadline date corresponding to a download date of the asset task list. Accordingly, the asset task list can be filtered to include the asset task entries that are to be completed on the day the asset task list is downloaded. Moreover, the computer-readable instructions, when executed by the one or more processor, can further cause the device to determine, based at least partly on the task completion data, an average amount of work hours associated with a type of task or a type of equipment; and cause an indication of the average amount of work hours to be presented at a user interface (e.g., associated with or displayed at the site operator device).

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for tracking and managing facility assets using a facility asset tracking platform. The facility assets can be located at any type of operational facility such as a refinery, a manufacturing plant or factory, a warehouse, a distribution center, a data center, a research and development facility, a laboratory, a military base or installation, an airport, a truck terminal, an industrial park, combinations thereof, and the like. By using the facility asset tracking platform, workflow data associated with the facility assets can be generated, managed, and displayed at various devices to improve efficiency of the operational facility. For instance, the facility asset tracking platform can include multiple applications operating together on different devices with different levels of connectivity throughout the operational facility, as well as a cloud-based application to interact with devices at the operational facility. This arrangement improves asset tracking and management by providing a platform that operates offline, with limited internet connectivity, and/or with internet connectivity for only one or a handful of devices (e.g., a primary operational site device at a central office or carried by a site operational leader). Furthermore, the asset tracking platform can operate on any type of device independent of the particular type of device or operating system on the device (e.g., Android®, iOS®, Windows®, Linux, etc.)

As such, the asset tracking platform disclosed herein can be used to create a digital version of the facility (e.g., represented as an asset task list, an asset map, and/or a task map) used for managing facility asset maintenance, inspection, and operation. The asset tracking platform can receive real-time signals (e.g., from field devices performing the various tasks in the field) and continually update via data syncs between the field devices and the site operator device. These techniques can improve document management for tracking the facility asset operations and maintenance, as well as improving business intelligence by collecting highly granular data related to completing the asset tasks, which can be aggregated and analyzed to determine costs and inefficiencies associated with the facility assets (e.g., by calculating an amount of labor hours associated with facility assets, an amount of equipment breakdowns, or the like) classifiable by equipment type, manufacturer, responsible field operator, operational site, and combinations thereof. Additional advantages will become apparent from the disclosure herein.

Figure 1:
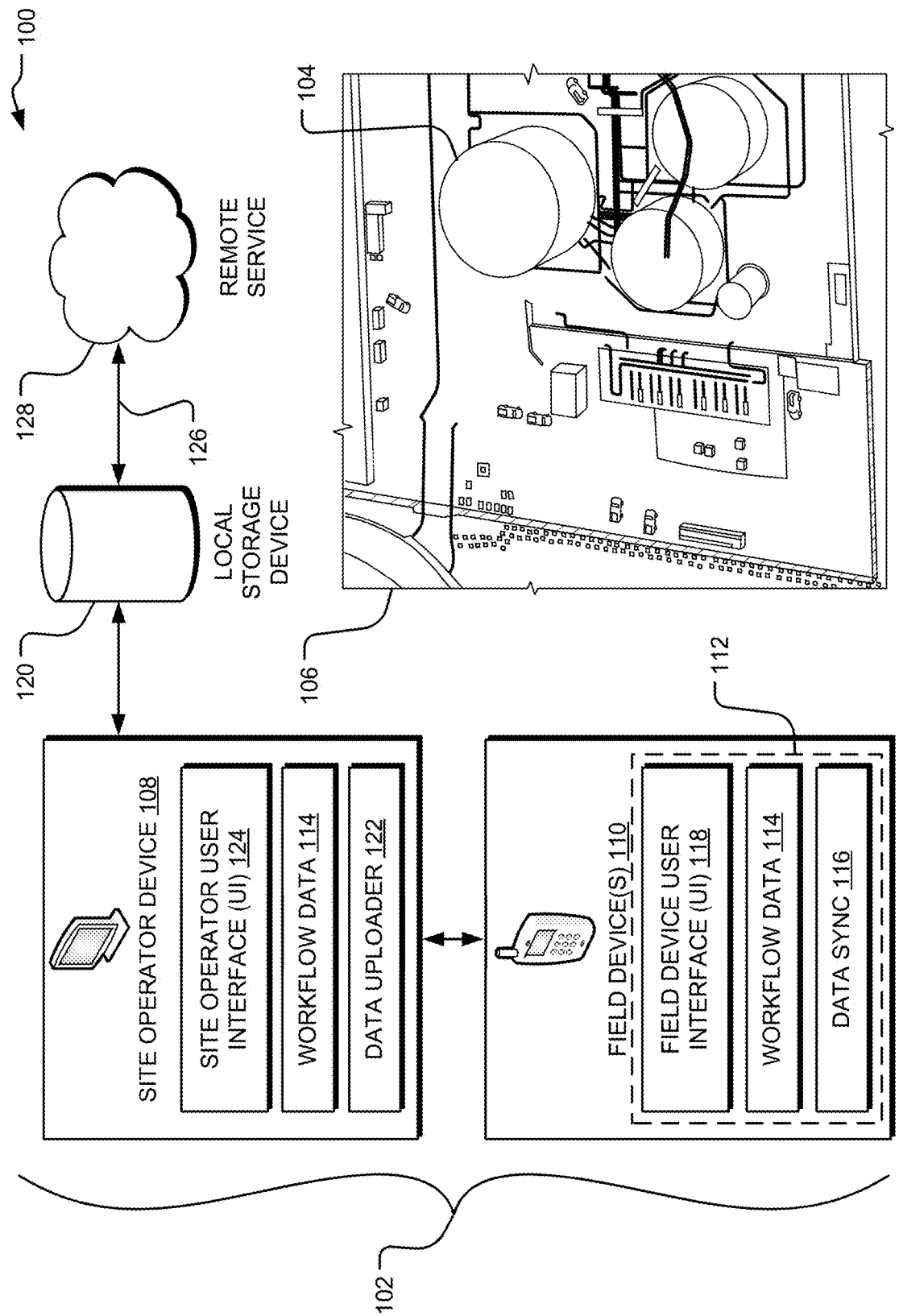
FIG. 1 illustrates an example system for tracking facility assets using an asset tracking platform.

FIG. 1 illustrates an example system 100 including an asset tracking platform 102 to track and analyze one or more facility asset(s) 104 and corresponding asset tasks and asset statuses at an operational site 106. The asset tracking platform 102 can include a site operator device 108 and/or one or more field device(s) 110. These devices can execute one or more applications 112 of the asset tracking platform 102 to generate, track, analyze, and/or output workflow data 114 associated with the operational site 106 to improve maintenance and operation of the facility asset(s) 104.

Figure 2:
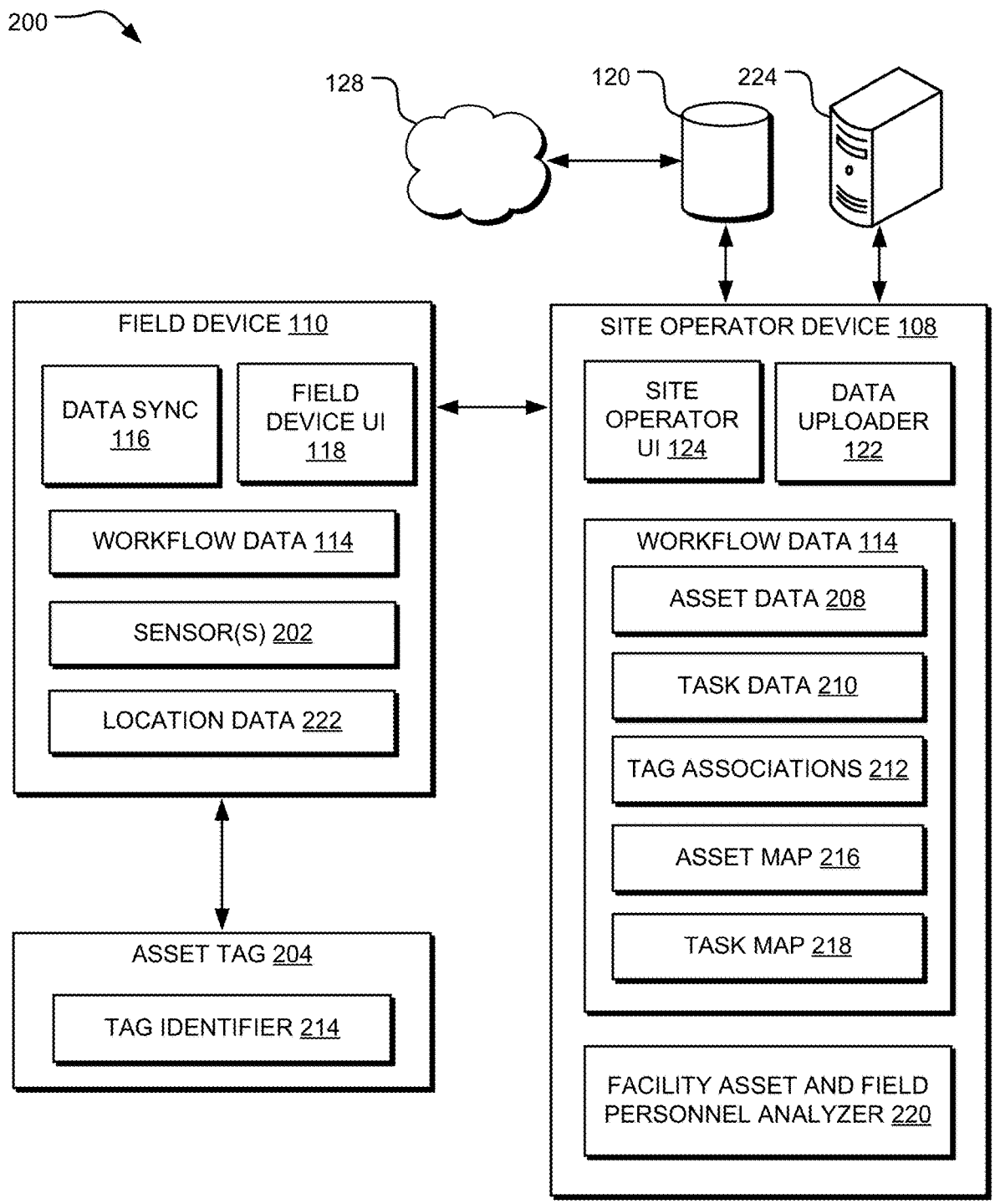
FIG. 2 illustrates an example system for tracking facility assets using a site operator device, a field device, and/or an asset tag.

In some instances, site operator device 108 can be a centralized device or office device, for instance, located in an administrative office or operational office of the operational site 106. Additionally or alternatively, the site operator device 108 can be a device associated with and/or carried by a lead site operator (e.g., a mobile device, tablet, etc.). The site operator device 108 can receive, aggregate, and/or store workflow data 114 for the operational site 106. The workflow data 114 can include data related to the facility asset(s) 104 (e.g., as discussed in greater detail below) that is continually updated via a plurality of data syncs 116 from the device(s) 110. For instance, one or more field personnel responsible for performing asset tasks (e.g., operational tasks, monitoring tasks, maintenance tasks, etc.) can carry the field device(s) 110 to the physical locations of the facility asset(s) 104 and use the field device(s) 110 to access the workflow data 114 and/or generate new workflow data 114. For instance, an application of the asset tracking platform 102 executing on the device(s) 110 can download the workflow data 114 from the 108 and/or cause the device(s) 110 to generate a field device user interface (UI) 118 representing the workflow data 114 to complete particular asset task for the facility asset 104. The field device(s) 110 can track, record, and/or store new workflow data 114 corresponding to actions taken with the field device(s) 110 to perform or complete the asset task. These asset task procedures can be performed using an asset tag 204 (as depicted in FIG. 2) at a location of the facility asset 104.

The field device 110 can conduct the data syncs 116 with the site operator device 108 (e.g., upon performing the asset task). For instance, the operational site 106 can include a local area network (LAN) or intranet to provide a communication channel between the field device(s) 110 and the site operator device 108. In some instances, the field device 110 can conduct the data sync 116 from various locations throughout the operational site 106 that have local network connectivity with the site operator device 108 (e.g., wired and/or wireless). Additionally or alternatively, the field device(s) 110 can perform the data syncs 116 in response to being within a predetermined distance of the site operator device 108, for instance, when the field personnel returns to an operations room or administrative building of the operational site 106. With the field device(s) 110 communicatively coupled to the site operator device 108, the field device(s) 110 can sync or upload the workflow data 114 collected while performing the asset task. Moreover, workflow data 114 can be downloaded from the site operator device 108 to the field device(s) 110 via the data syncs 116.

In some instances, the site operator device 108 is configured to store the workflow data 114 (e.g., received from the field device(s) 110) locally at a local storage device 120 (e.g., at the operational site 106 and/or physically coupled to or forming a part of the site operator device 108). The site operator device 108 can retain the workflow data 114 and/or a latest update of workflow data 114 from the field device(s) 110 at the local storage device 120 until a data uploader 122 of the site operator device 108 is initiated. The data uploader 122 can be initiated in response to receiving a site operator input at the site operator device 108. For instance, the site operator input can be received at a site operator UI 124 presented at the site operator device 108.

In response to initiating the data uploader 122, the site operator device 108 can perform an external upload 126 to a remote service 128 outside the operational site 106. The external upload 126 can be initiated to sync with an availability of resources, which is especially helpful for remote environments with limited computing or transmission resources (e.g., reliant on satellite communication and the like). The remote service 128 can be a server and/or database located remotely from the operational site 106 (e.g., in a different region, city, country, etc.), such as a cloud service, a Software-as-a-Service (SaaS), and the like. The remote service 128 can be provided by the asset tracking platform 102 in addition to the application(s) executing on the site operator device 108 and/or the field device(s) 110.

The facility asset tracking procedures performed by the asset tracking platform 102 discussed herein can use this configuration of the site operator device 108 and the field device(s) 110 with the local data syncs 116 and input-initiated external uploads 126 to improve facility asset tracking and management at the operational site 106. The field personnel can perform the asset tasks for various facility asset(s) 104 throughout the operational site 106 even where data services and cellular services are limited or unavailable for the field device(s) 110. Moreover, the asset tracking platform 102 can cause the workflow data 114 to be generated, aggregated, and/or analyzed on an hourly, daily, or even minute-by-minute basis to provide a real-time view (e.g., via the site operator UI 124) of the statuses of the various asset(s) 104 with improved accuracy, data flow efficiency, data upload timing, and overall efficiency of computing resources.

Turning to FIG. 2, an example system 200 for tacking facility assets 104 using the asset tracking platform 102 is depicted. As shown in FIG. 2, the workflow data 114 can include various types of data related to the assets, asset tasks, asset status, and/or field personnel. Moreover, the system 200 can include the field device 110 with one or more sensors 202 to interact with one or more asset tag(s) 204. The system 200 can form at least a portion of the system 100 depicted in FIG. 1.

In some examples, the workflow data 114 can include asset data 208. The asset data 208 can be information associated with the facility assets 104 distributed throughout the operational site 106. For instance, the asset data 208 can include an asset type, an asset identifier, an applicable standard (e.g., industry standard) for the asset, a facility name associated with the asset, an asset description, and the like. The workflow data 114 can also include task data 210. The task data 210 can be associated with and/or be included with the asset data 208 and can include a task identifier, a task category, a task status, a task frequency, a task opened date, a task completed date, and the like. Tag associations 212 can also be included in the workflow data 114 associated with or as a part of the asset data 208. The tag associations 212 can be data indicating associations between one or more tag identifier(s) 214 associated with the one or more asset tags 204. The tag associations 212 can be generated via an asset tag assignment procedure (e.g., using the asset tag assignment interface 902 discussed below regarding FIG. 9).

The workflow data 114 can, in some scenarios, include an asset map 216 and/or a task map 218. The asset map 216 can be a map generated and presented at the field device(s) 110 or the site operator device 108 showing the facility assets 104 as one or more visual indicators layered over a map of the operational site 106. The task map 218 can also be generated and/or presented at the field device(s) 110 to show locations of the asset tasks (e.g., filtered by assigned field personnel, task duration, task proximity to field device 110, required completion date, combinations thereof, and the like). The asset map 216 and the task map 218 are discussed in greater detail below regarding FIGS. 11 and 12.

In some instances, the asset tracking platform 102 can include a facility asset and field personnel analyzer 220 (e.g., stored and executed at the site operator device 108 and/or the remote service 128). The facility asset and field personnel analyzer 220 can receive the workflow data 114 and perform various analytics to generate outputs corresponding to the facility assets 104, the operational site 106, and/or the field personnel. For instance, the facility asset and field personnel analyzer 220 can determine a number of open or incomplete asset tasks, a number of closed or completed asset tasks, a number of total open asset task hours (e.g., for a particular time period), a total cost associated with open asset tasks, and the like. Furthermore, the facility asset and field personnel analyzer 220 can identify a missed asset task for a particular day and generate an alert, as well as determine averages of various site metrics, such as an amount of work hours by equipment type, breakdowns per individual equipment or equipment type, and/or task duration times per field personal. The facility asset and field personnel analyzer 220 can also determine a frequency of equipment failures to use in comparisons of different operational facilities.

Moreover, the asset tracking platform 102 can generate various visualizations and graphs representing data outputted by the facility asset and field personnel analyzer 220. These can provide different levels of detailed information, which can correspond to key performance indicators and/or show different aspect of facility health with real-time signals. For instance, the asset tracking platform 102 can use the regularly updated asset data 208 and/or task data to determine and show fuel levels in tank (e.g., with a calculation of how many days until more fuel is needed), whether a pump is on or off, and give a real-time dashboard of the facility. The asset tracking platform 102 can also estimate how many work hours are needed to perform the asset tasks, and whether enough field personnel are operating. This business intelligence data and other analysis outputs of the asset tracking platform 102 can be output as a part of a larger report representing key performance indicators for the operational site 106. The outputs of the asset tracking platform 102 can be normalized, for instance, to rank operators at one operational site 106 as compared to another operational site 106. Some analysis outputs can have a more detailed granularity, such as asset-specific rankings (e.g., based on costs, number of downtime hours, manufacturer, install year, etc.).

In some examples, the facility asset and field personnel analyzer 220 can analyze workflow data 114 associated with the field personnel to output field personnel analytics. For instance, the asset tracking platform 102 can determine which field personnel generate the most and/or least work orders, which field personal completes asset tasks in a most timely manner, and the like. The asset tracking platform 102 can generate an estimated time for completing asset tasks and compare actual completion times for particular field personnel to the estimates. In some scenarios, the platform can determine how long it takes different people to complete the same asset task, and can generate an average completion time for the asset task based on this data. The average completion time can be compared to other facility assets at that operational site 106 and/or other operational sites 106. In some scenarios, the asset tracking platform 102 can trigger a red flag or alert if a task is open for an amount of time greater than a threshold value based on the average completion time.

In some examples, the asset tracking platform 102 can include the one or more asset tag(s) 204. The asset tag(s) 204 can be physical tags placed at and assigned to the facility assets 104. The different, individual facility assets 104 at the operational site 106 can have their own corresponding, identifying asset tags 204. The asset tag(s) 204 can be a Near Field Communication (NFC) tag that uses RFID to provide information, such as the tag identifier(s) 214, to the field device(s) 110. As such, the asset tag(s) 204 can be passive (e.g., not requiring a power source), and can be formed of a durable, rugged, weather resistant material such as a hard plastic to last for years in the field. The asset tag 204 can be associated with the tag identifier 214 which can be a standardized identifier, including one or more of a MAC Address, an IP address, other alphanumeric values or symbols, and the like. The asset tags 204 can omit any outer identifying marks or engravings such that the plurality of asset tags 204 distributed throughout the operational site 106 are visibly uniform (e.g., to prevent copying), using the NFC RFID circuitry embedded in the asset tag(s) 204 instead of visible indicators (e.g., printed or engraved alphanumeric symbols, bar codes, QR codes, etc.). The sensors 202 on the field device 110 can include an NFC reader for reading the tag identifier(s) 214 from the asset tag(s) 204 when the field device(s) 110 is in close proximity to the asset tag(s) 204. In some scenarios, location data 222 associated with the field device(s) 110 (e.g., global positioning satellite (GPS) coordinates) can be associated with the tag identifier 214 (e.g., and the corresponding facility assets 104 to which the asset tag 204 is attached) upon reading the asset tag 204 with the field device(s) 110. These techniques are discussed in greater detail below regarding the asset tag assignment interface 902 and the task execution interface 1302. The asset tag(s) 204 distributed throughout the operational site 106 can have a one-to-one correspondence with the facility assets 104 being tracked and managed by the asset tracking platform 102.

In some instances, the different components of the asset tracking platform 102 can be used by multiple different user categories, such as engineers, owners, site operators (e.g., lead site operators or general managers), field personnel, operator mechanics, and the like. Some personnel can have access to a lead operator application of the asset tracking platform 102 (e.g., as a web portal or application at the site operator device 108) while other personnel can have access to a field personnel application (e.g., as a locally stored application on the field device(s) 110). In some scenarios, the field device(s) 110 operating the locally stored application, and the various interfaces discussed below, are used as training devices for a field operator training procedure.

As noted above, the asset tracking platform 102 can be provided as a cloud-based service that also includes a first locally-stored application at the site operator device 108 and/or a second locally-stored application at the field device(s) 110, and combinations thereof. The data discussed herein can be stored at one or more database(s) (e.g., the local storage device 120 and/or storage devices of the remote service 128) and can be executed by one or more server(s) 224 of the asset tracking platform 102. The server(s) 224 can be located remote from the operational site 106 but can also include hardware components at the operational site 106. The database(s) can store any of the data files and/or software instructions discussed herein, including associations between these different data files. Moreover, the data in the database(s) can be aggregated to perform the operations discussed herein. The one or more server(s) 224 may be a single server, a plurality of servers with each such server being a physical server or a virtual machine, or a collection of both physical servers and virtual machines. The server(s) 224 may represent an instance among large instances of application servers in a cloud computing environment, a data center, or other computing environment. The one or more databases and/or the one or more server(s) 224 can form a portion of one or more computing devices 1502 of the asset tracking platform 102, as discussed below regarding FIG. 15. Furthermore, the asset tracking platform 102 can include one or more network(s) to provide a communication channel between the site operator device 108 and the field device(s) 110, as well as between the site operator device 108 and the remote service 128. The network(s) can be one or more of a local area network (LAN) (e.g., Wi-Fi, Bluetooth®, Near Field Communication (NFC), etc.) a wide area network (WAN) (e.g., ethernet, fiber, Internet-of-Things (IoT), the Internet, etc.), a cellular network (e.g., third generation (3G), fourth generation (4G), Long-Term Evolution (LTE), fifth generation (5G), etc.), and the like.

Figure 3:
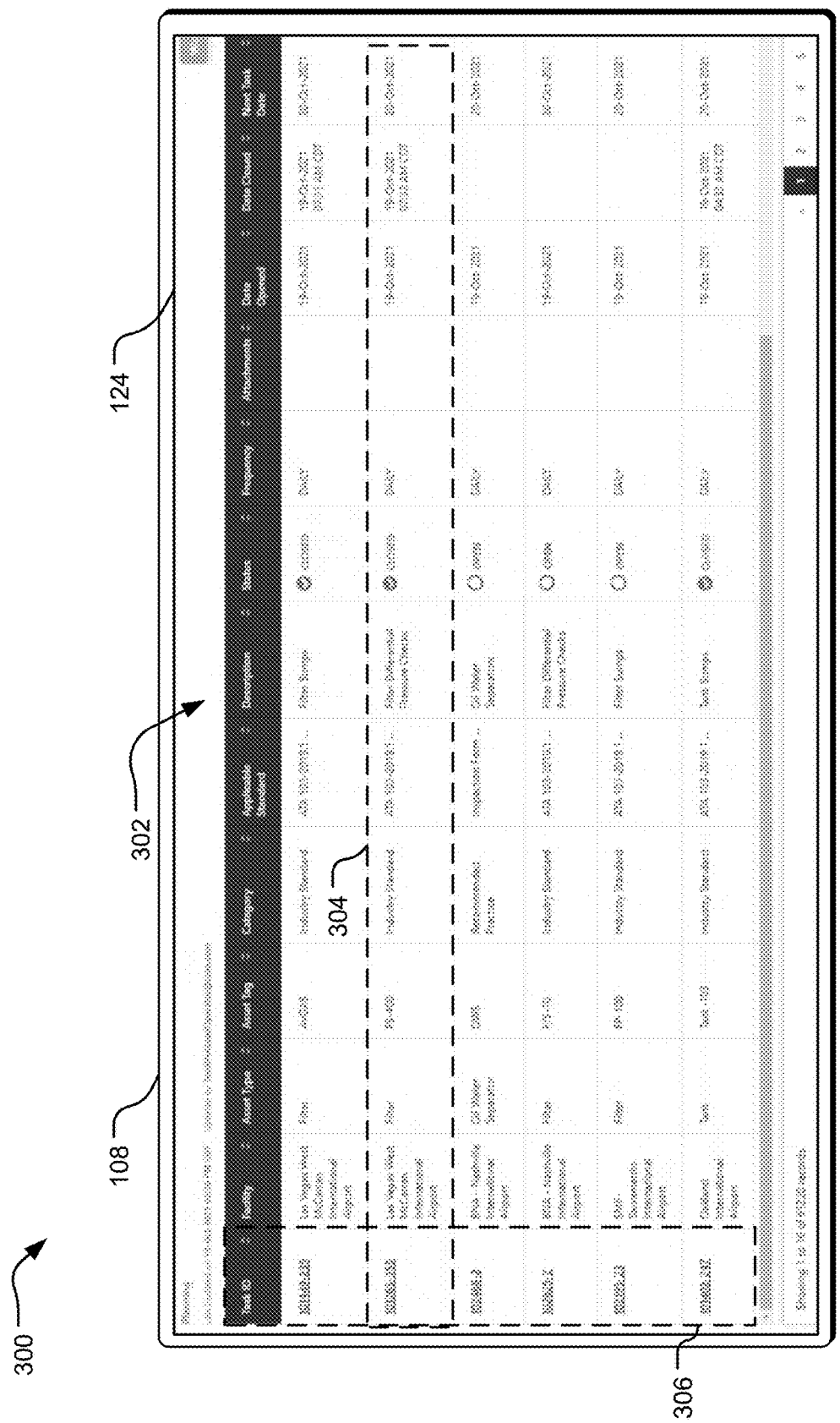
FIG. 3 illustrates an example system for tracking facility assets using a task list at a site operator device.

FIG. 3 illustrates an example system 300 for tracking facility assets 104 using the asset tracking platform 102. As depicted in FIG. 3, the system 300 can include a task list 302 representing the asset data 208 and the task data 210 (e.g., and/or other workflow data 114), which can be presented at the site operator UI 124. The system 300 can form at least a part of the system 100 depicted in FIG. 1.

In some examples, the site operator device 108 can download the task list 302 after signing into a web portal, which then retrieves the asset data 208 and the task data 210 from the remote service 128. The site operator device 108 can initiate this download and can specify a number of tasks to download (e.g., the first or most urgent 500 tasks). Moreover, asset tracking platform 102 can receive inputs from the site operator device 108 specifying which tasks to download from the remote service 128 (e.g., filtered by operational site 106, by field personnel, by start date or end date, asset type, asset category, applicable standard, etc.). The task list 302 can represent tasks to be done the day of the task list download and/or the day following the task list download. Upon downloading the task list 302, the site operator device 108 can disconnect from or omit any further reliance on the network connection with the remote service 128 to perform the various asset tracking techniques disclosed herein. The task list 302 can include the most recent or latest updates and changes to asset data 208 and task data 210.

In some instances, the task list 302 can be a list or spreadsheet with a row 304 of the task list 302 representing an asset task, and a column 306 of the task list 302 representing a particular type of asset data 208 or task data 210. For instance, one or more columns can represent an asset identifier, an asset type, an applicable standard for the asset, a facility name associated with the asset, an asset description, a task identifier, a task category, a task status, a task frequency, a task opened date, a task completed date, and the like. The task list 302 can include one or more interactive elements (e.g., the task identifiers) that, upon receiving a user input, cause the site operator UI 124 to present additional details regarding the selected task or task entry. The task list 302 can be used for workflow planning at the operational site 106 by selecting which tasks or task filters to apply to asset task lists that are downloaded to field operator devices 110, as discussed below.

Figure 4:
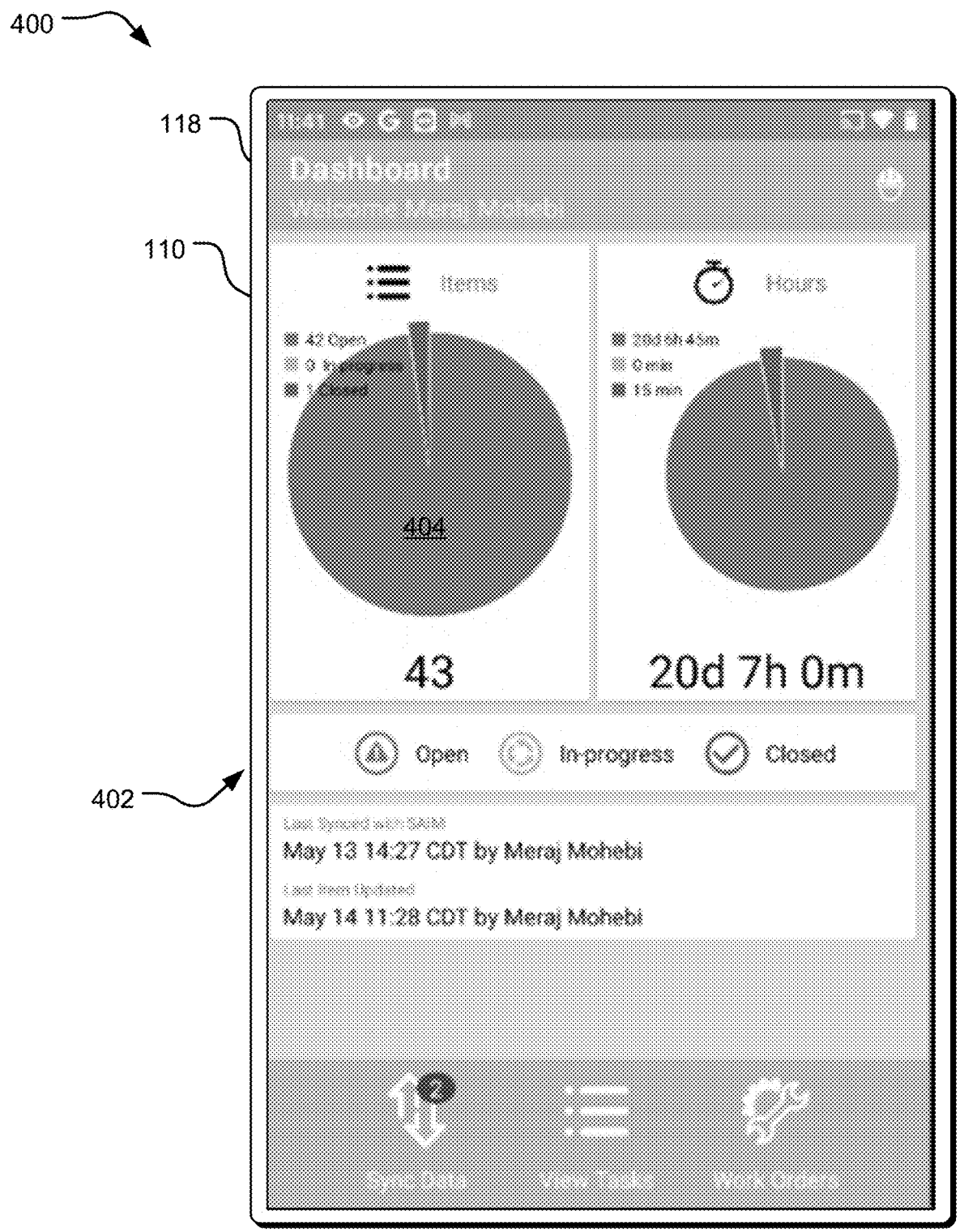
FIG. 4 illustrates an example system for tracking facility assets using a field operator dashboard at a field device.

FIG. 4 illustrates an example system 400 for tracking facility assets 104 using the asset tracking platform 102. As depicted in FIG. 4, the system 400 can include a field operator dashboard 402 for performing various field operations, such as completing asset tasks. The field operator dashboard 402 can be presented at the field device UI 118. The system 400 can form at least a part of the system 100 depicted in FIG. 1.

In some examples, the field operator dashboard 402 includes a summary window 404 presenting a visualization (e.g., a pie chart, a bar graph, a list, etc.) of open tasks, in-progress tasks, and/or closed tasks. The field operator dashboard 402 can include a last sync update portion providing information about the latest data sync to the field device 110 (e.g., a date, a time, and/or a number of downloaded tasks). Moreover, the field operator dashboard 402 can include a data sync button for initiating the data syncs 116 in response to an input, a view tasks button for viewing the downloaded task list 702 (discussed below regarding FIG. 7), and/or a work order button for initiating the creation of a work order (e.g., discussed below regarding FIG. 14). Once one or more tasks listed in the downloaded task list 702 are completed, task completion data is generated, such as a status change for the completed task (e.g., from open or in-progress to closed), a task completion time, a task attachment or comment, a red flag, a task completion field device location, a notification at the field operator dashboard 402 (e.g., or other interface of the field device UI 118) indicating that the change has occurred, and the like.

Figure 5:
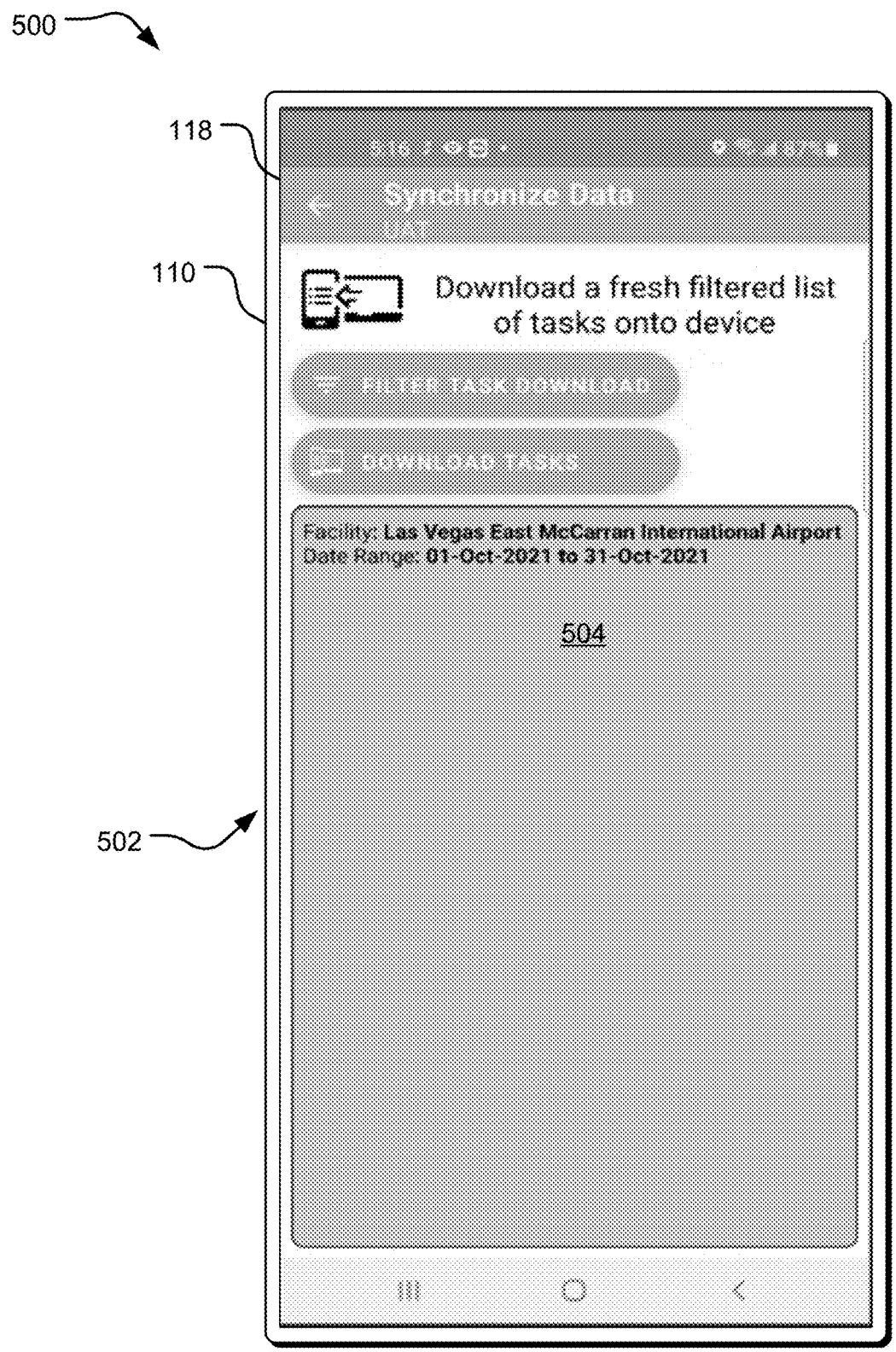
FIG. 5 illustrates an example system for tracking facility assets using a data synchronizer interface at a field device.

FIG. 5 illustrates an example system 500 for tracking facility assets 104 using the asset tracking platform 102. As depicted in FIG. 5, the system 500 can include a data synchronizer interface 502 for performing the data syncs 116. The data synchronizer interface 502 can be presented at the field device 110. The system 500 can form at least a part of the system 100 depicted in FIG. 1.

The data synchronizer interface 502 can present an instruction to download a fresh filtered list of tasks to the field device(s) 110. Additionally, the data synchronizer interface 502 can include a task filtering button (e.g., to cause the field device UI 118 to present the asset task filter interface 602 discussed below), and/or a download task button for initiating the task download. The data synchronizer interface 502 can also include a filter window 504 showing filters applied to the task download (e.g., a facility name or operational site 106 name, a date range, etc.

Figure 6:
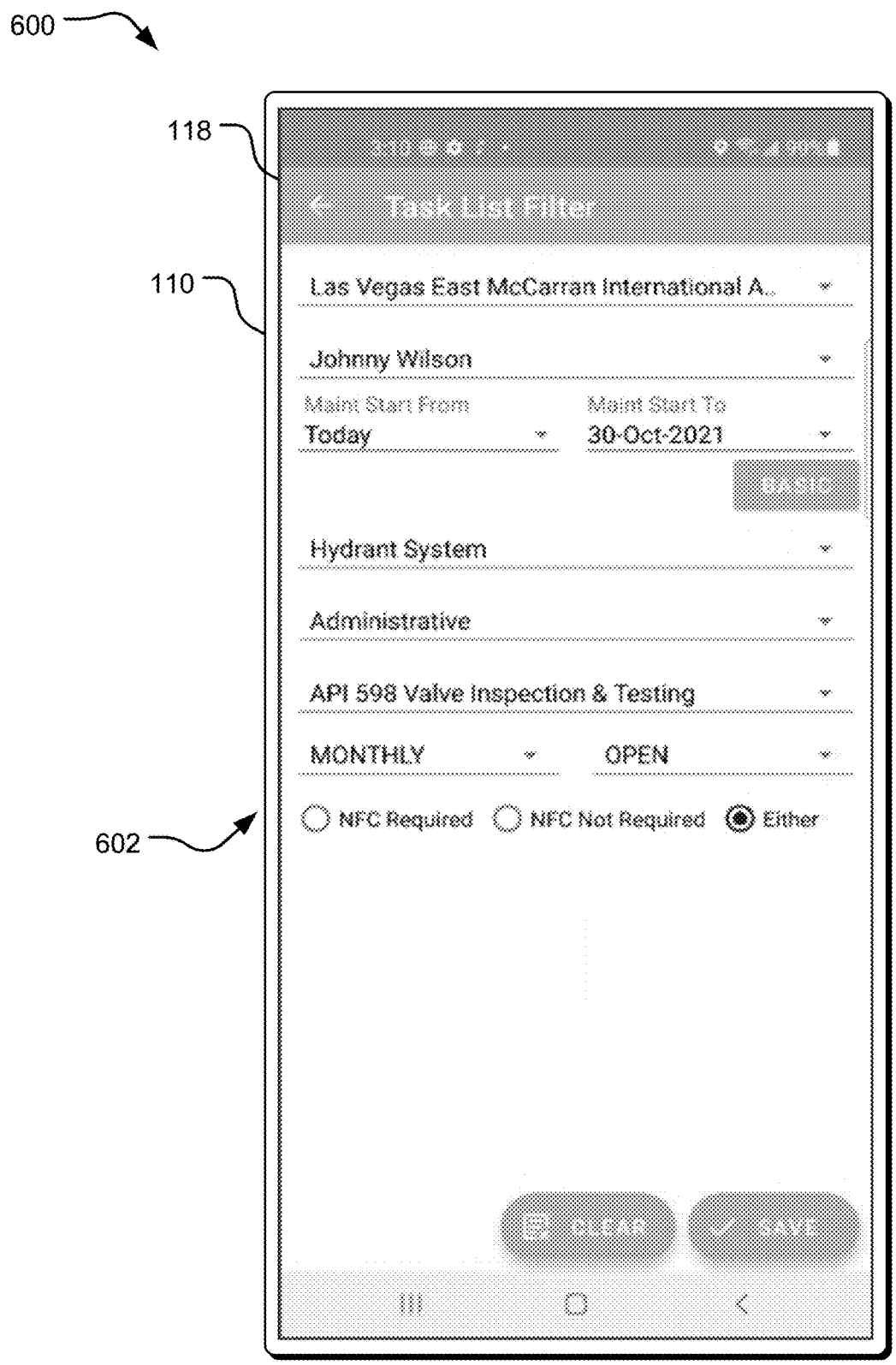
FIG. 6 illustrates an example system for tracking facility assets using an asset task filter interface at a field device.

FIG. 6 illustrates an example system 600 for tracking facility assets 104 using the asset tracking platform 102. As depicted in FIG. 6, the system 600 can include an asset task filter interface 602 for performing the data syncs 116. The asset task filter interface 602 can be presented at the field device 110, for instance, in response to an input at the task filtering button of the data synchronizer interface 502. The system 600 can form at least a part of the system 100 depicted in FIG. 1.

In some examples, the asset task filter interface 602 includes a plurality of filter fields or selectable icons representing different filter features. The filter fields can include a facility or operational site filter, an inspector filter, a maintenance start date, a maintenance end date, an asset type, an asset or task category, an applicable standard for the asset, a task frequency, a task status, and/or an indication of whether NFC is required for the task. Upon entering a particular combination of filters for the task download, that particular combination of filters can be saved and/or retrieved for future task downloads.

Figure 7:
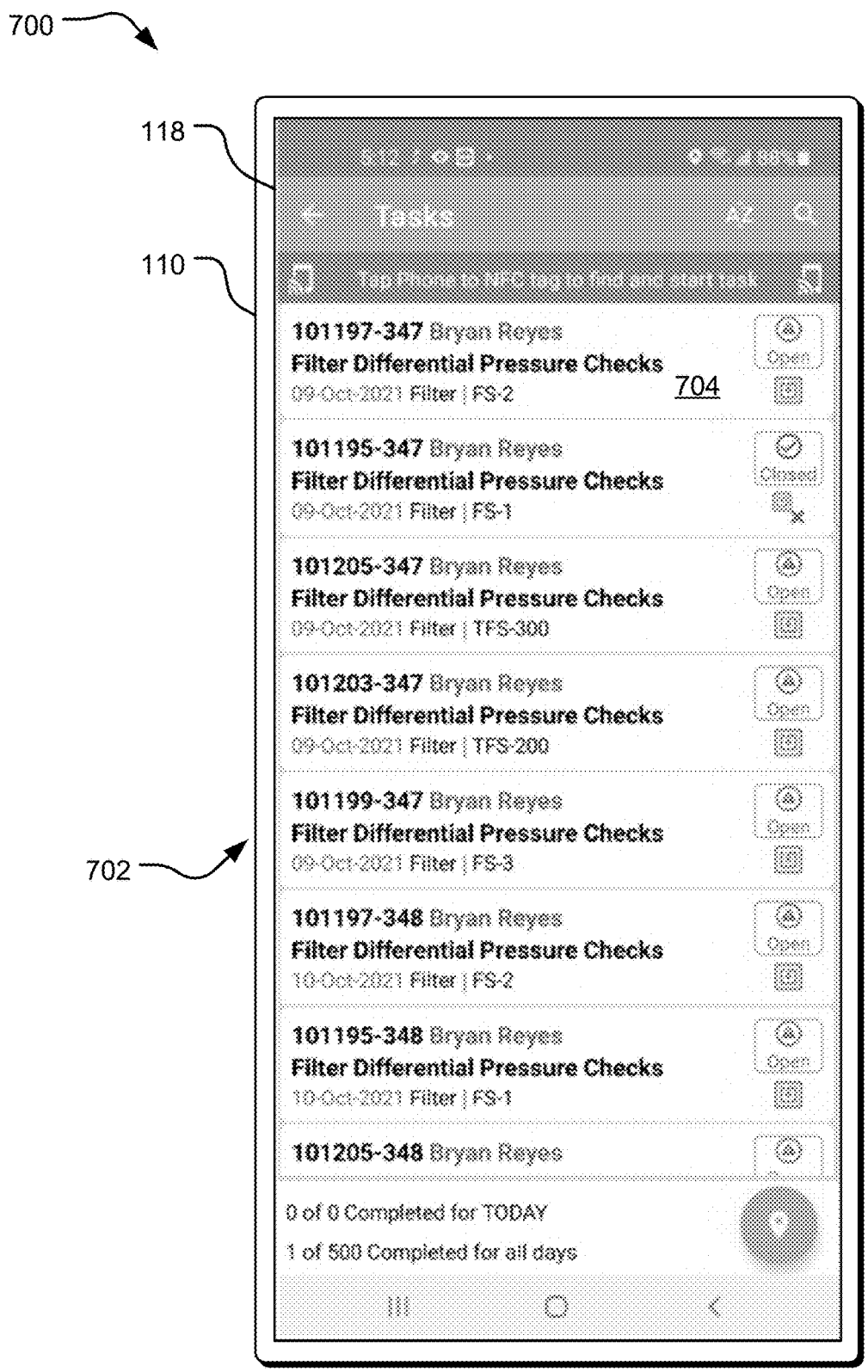
FIG. 7 illustrates an example system for tracking facility assets using a downloaded task list at a field device.

FIG. 7 illustrates an example system 700 for tracking facility assets 104 using the asset tracking platform 102. As depicted in FIG. 7, the system 700 can include a downloaded task list 702 for viewing the task data 210 received via the data syncs 116. The downloaded task list 702 can be presented at the field device 110 and the system 700 can form at least a part of the system 100 depicted in FIG. 1.

In some examples, the downloaded task list 702 can include one or more task entries 704, which can correspond to the values entered into the filter fields of the asset task filter interface 602. The one or more task entries 704 can be rows representing the tasks and/or facility assets corresponding to the particular field personnel using the field device(s) 110. As such, the downloaded task list 702 can form a daily (e.g., or weekly, monthly, etc.) task schedule for the field personnel. The one or more task entries 704 can include the task identifier and a personnel identifier indicating a person responsible for performing the task and/or a last person to perform the task. Moreover, the task entry 704 can include an asset description, an asset code or identifier, a task description, and/or a task due date. The task entry 704 can include a task status (e.g., as a first icon) indicating open or closed, as well as a tag status (e.g., as a second icon) indicating whether an asset tag 204 is assigned to the facility asset 104 of the task entry 704, and whether the asset tag 204 has been scanned by the field device 110. The downloaded task list 702 can include an indication of how many tasks have been completed for today or for all days. In some instances, based on filters used in the asset task filter interface 602, the one or more task entries 704 can represent only open tasks. The field device UI 118 can also present a map button (e.g., presented with the downloaded task list 702) for showing locations of the tasks of the downloaded task list 702 on the task map 218 and/or showing a current location of the field device 110.

Figure 8:
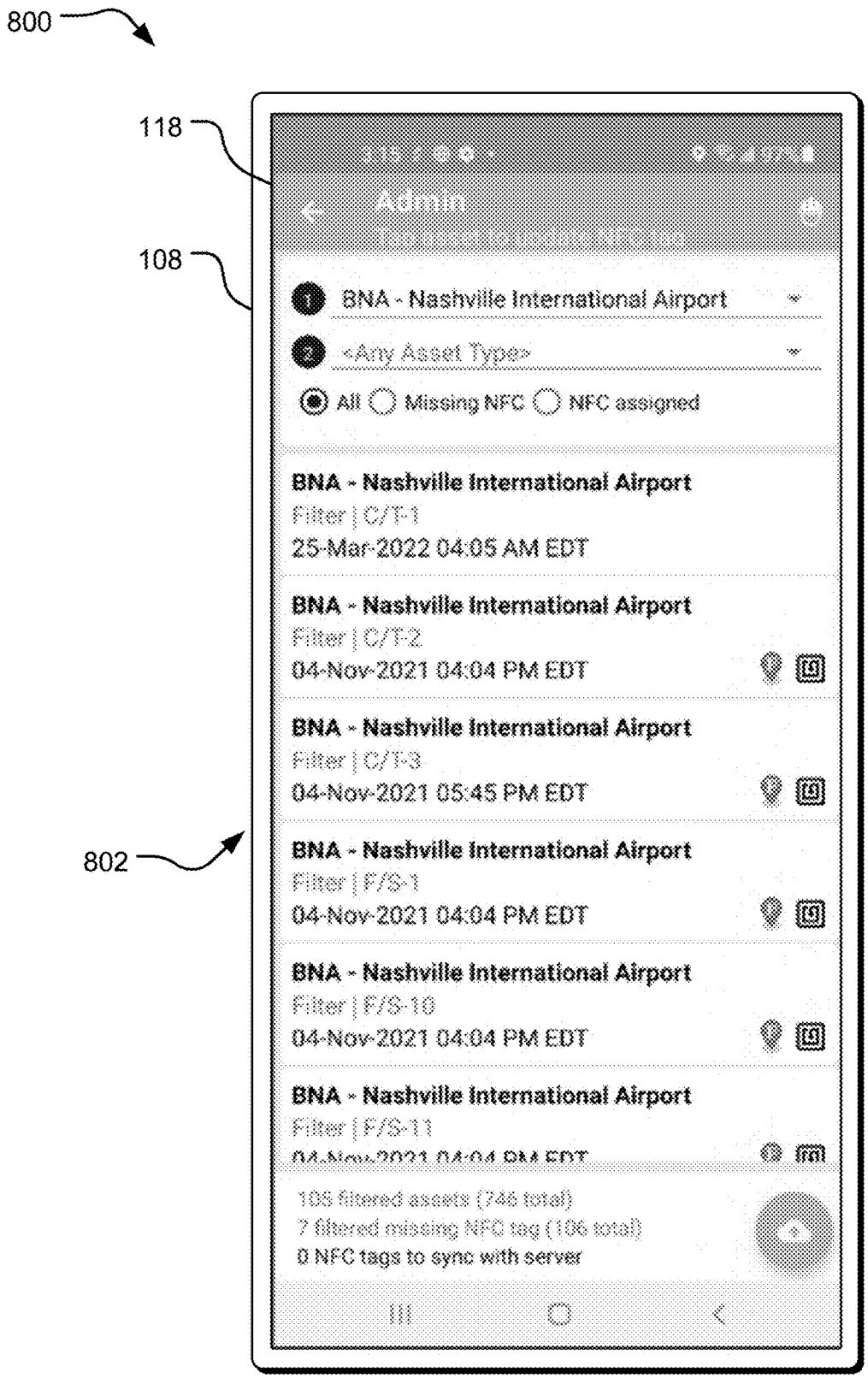
FIG. 8 illustrates an example system for tracking facility assets using a downloaded facility asset list.

FIG. 8 illustrates an example system 800 for tracking facility assets 104 using the asset tracking platform 102. As depicted in FIG. 8, the system 800 can include a downloaded facility asset list 802 for viewing the asset data 208 and/or the task data 210 received via the data syncs 116. The downloaded facility asset list 802 can be presented at the field device 110 and/or the site operator device 108. Moreover, the system 800 can form at least a part of the system 100 depicted in FIG. 1. The downloaded facility asset list 802 includes a plurality of facility asset entries 804 including a facility or operational site identifier, as well as the asset data 208 and task data 210 discussed above regarding the downloaded task list 702. The facility asset entries 804 can include an indication of whether the facility asset 104 is missing an asset tag 204. Moreover, the UI presenting the downloaded facility asset list 802 can also (e.g., simultaneously) present one or more filter fields or selectable icons for filtering the downloaded facility asset list 802 (e.g., by facility or operational site, by asset type, and/or by whether a tag has been assigned to the facility assets 104, whether a tag has been scanned/the task is in-progress, and the like).

Figure 9:
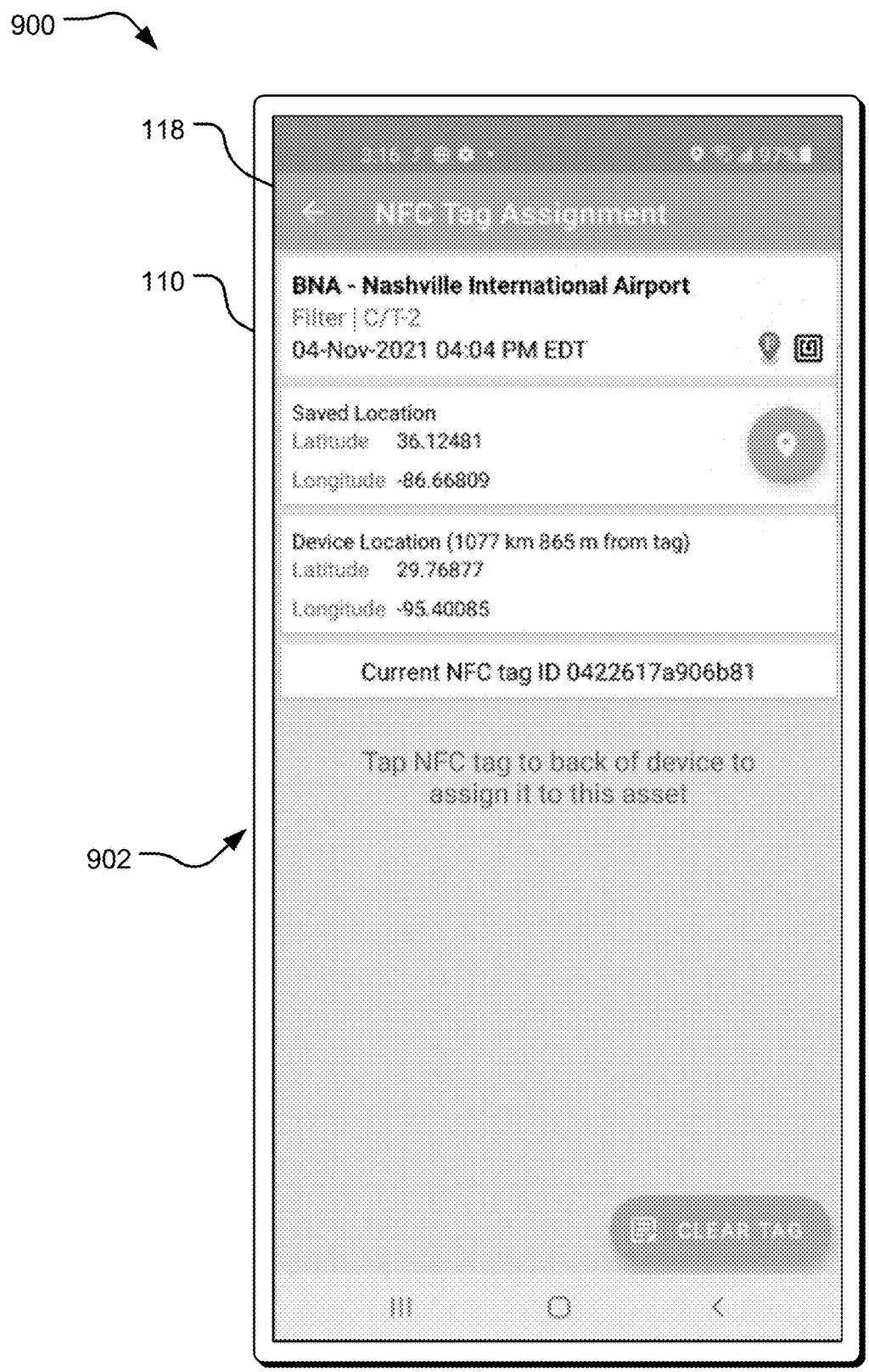
FIG. 9 illustrates an example system for tracking facility assets using an asset tag assignment interface at a field device.

FIG. 9 illustrates an example system 900 for tracking facility assets 104 using the asset tracking platform 102. As depicted in FIG. 9, the system 900 can include an asset tag assignment interface 902 for performing an asset tag assignment procedure. The asset tag assignment interface 902 can be presented at the field device 110, and the system 900 can form at least a part of the system 100 depicted in FIG. 1.

In some examples, the asset tag assignment interface 902 is used for assigning the asset tag(s) 204 to the facility assets 104. This asset tag assignment procedure can be performed with the field device(s) 110 at the physical location of the facility asset 104. As discussed above, the asset tag 204 can already be associated with the tag identifier 214 such as a particular NFC tag ID, embedded in the asset tag 204. The asset tag 204 can be hung on or attached to the facility asset 104 (e.g., equipment) by the field personnel, and then scanned by the field device 110 to assign the asset tag 204 to the facility asset 104. By performing this asset tag assignment procedure, the tag association 212 can be generated between the tag identifier 214 and any additional information provided or generated by the field device(s) 110. For instance, the tag associations 212 can be generated to receive the tag identifier 214, and then assign the tag identifier to other asset data 208 associated with the facility asset 104 (e.g., selected at the downloaded task list 702, such as an asset identifier). The tag associations 212 can also include an association with the location data 222 of the field device 110 at a time that the asset tag assignment procedure is being performed. The field device UI 118 can receive an input at an interactive element to delete or clear the tag associations 212 for the particular asset tag 204 that has been scanned. The asset tag assignment procedure can be repeated for a plurality of asset tags 204 and a plurality of facility assets 104 throughout the operational site 106.

Figure 10:
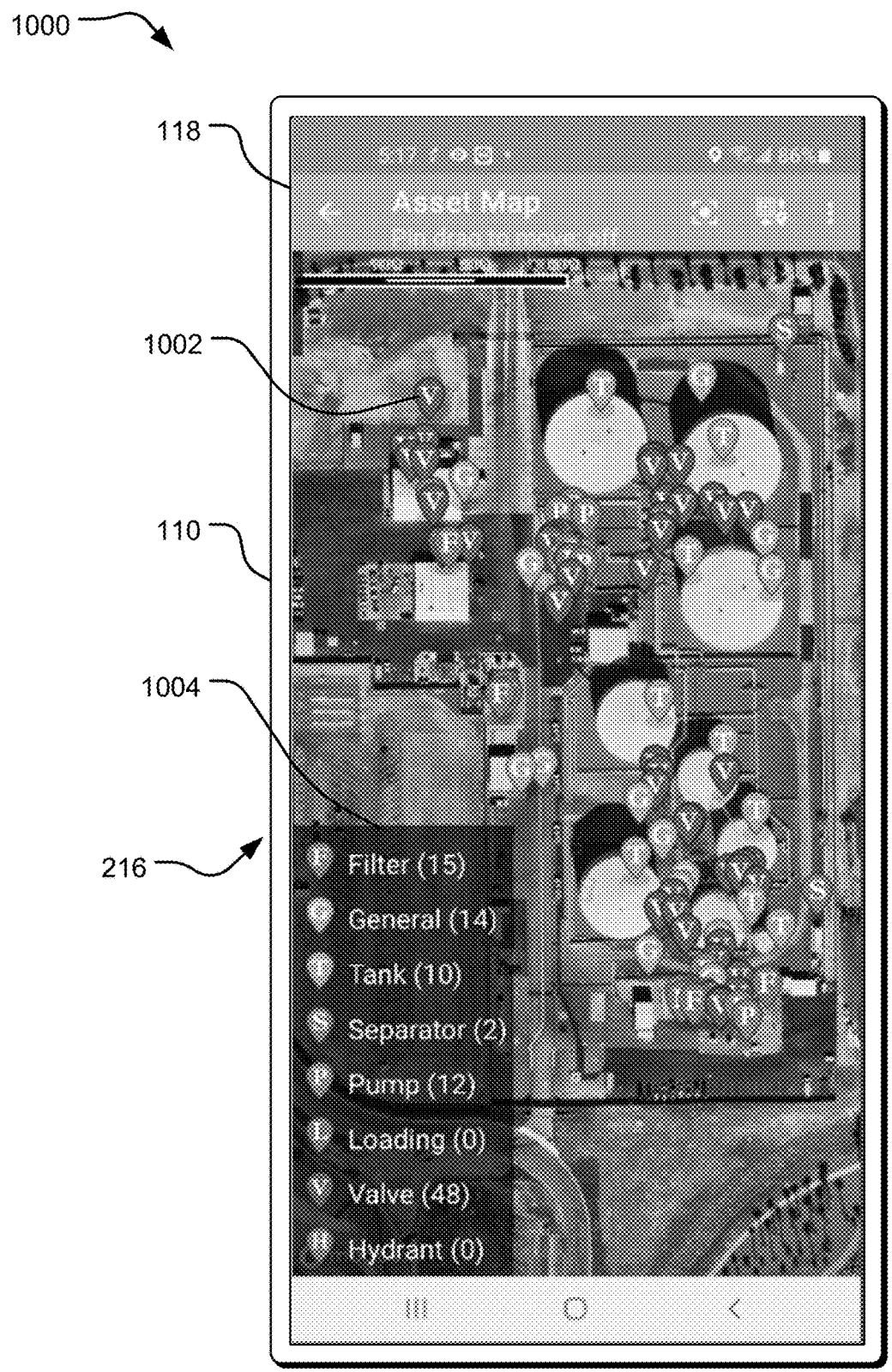
FIG. 10 illustrates an example system for tracking facility assets using an asset map at a field device.

FIG. 10 illustrates an example system 1000 for tracking facility assets 104 using the asset tracking platform 102. As depicted in FIG. 10, the system 1000 can include the asset map 216 for viewing one or more tagged facility assets 104. The asset map 216 can be presented at the field device 110 and/or the site operator device 108. Moreover, the system 1000 can form at least a part of the system 100 depicted in FIG. 1.

In some examples, the asset map 216 is generated once one or more asset tag(s) 204 are attached and assigned to the facility assets 104 or equipment. The asset map 216 can include a map image (e.g., bird's eye view) of the operational site 106 or a portion of the operational site 106 (e.g., using a zoom or scroll) with one or more asset indicators 1002 layered over the map image. The one or more asset indicators 1002 can be color coded with colors corresponding to the different asset types (e.g., filter, general, tank, separator, pump, loading, valve, hydrant, and the like). Moreover, the asset indicators 1002 can include a number or letter indicating the asset types. The asset map 216 can also present an indicator key 1004 to list the asset types represented by the asset indicators 1002, as well as a number value indicating a total number of the particular asset type (e.g., with an open task status for that day) at the operational site 106.

Figure 11:
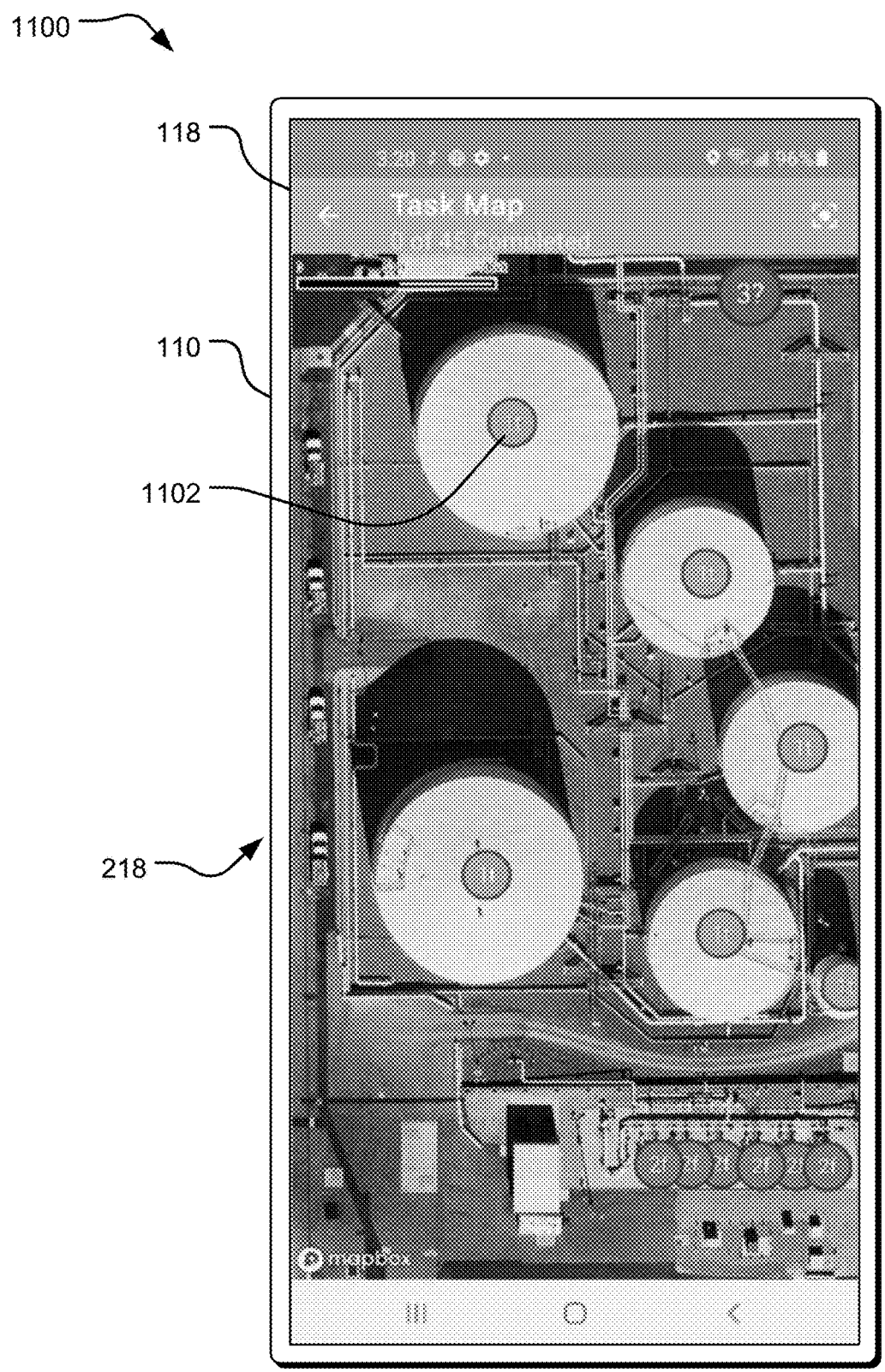
FIG. 11 illustrates an example system for tracking facility assets using an asset map at a field device.

FIG. 11 illustrates an example system 1100 for tracking facility assets 104 using the asset tracking platform 102. As depicted in FIG. 11, the system 1100 can include an task map 218 for viewing the task data 210. The task map 218 can be presented at the field device 110, and the system 1100 can form at least a part of the system 100 depicted in FIG. 1.

In some examples, the task map 218 can be presented in response to an input at the downloaded task list 702. The task map 218 can include the map image of the operational site 106 with one or more task identifiers 1102 layered over the map image. The one or more task identifiers 1102 can correspond to the task entries 704 of the downloaded task list 702 (e.g., or a sub-list of the 702) to present a visual indication of the physical locations for performing the tasks. The task map 218 can show tasks with a completion date that is the current date (e.g., today) or current week or have an open and/or in-progress status. The one or more task identifiers 1102 can be color coded and/or include an alphanumeric symbol representing the type of asset corresponding to the task or other task data 210. The field personnel can use the task map 218 to find closest tasks and/or to perform tasks in an efficient order based the physical locations of the tasks throughout the operational site 106.

Figure 12:
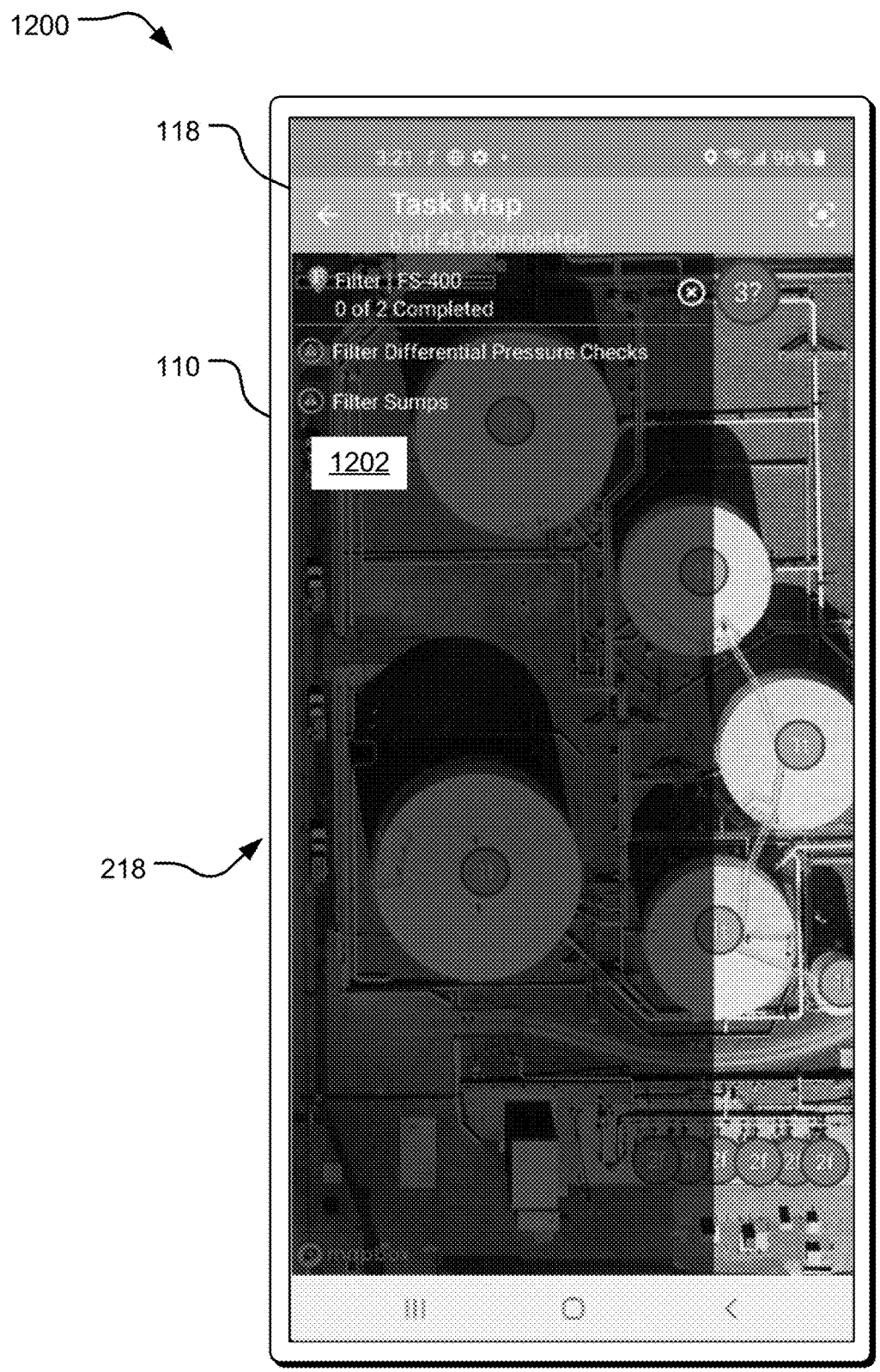
FIG. 12 illustrates an example system for tracking facility assets using a task map at a field device.

FIG. 12 illustrates an example system 1200 for tracking facility assets 104 using the asset tracking platform 102. As depicted in FIG. 12, the system 1200 can include the task map 218 and an asset-specific tasks list 1202 for viewing the task data 210 for a particular facility asset 104. The system 1200 can form at least a part of the system 100 depicted in FIG. 1. In some examples, the asset-specific tasks list 1202 is presented at the field device UI 118 responsive to a user input (e.g., a hover, click, tap, etc.) at an asset indicator 1002, at a task identifier 1102, and/or by scanning the asset tag 204 associated with the particular facility asset 104. In response, the asset tracking platform 102 can determine all tasks associated with the selected or scanned facility asset 104 and can cause the asset-specific tasks list 1202 to be presented (e.g., at least partly layered over the task map 218). Accordingly, the field personnel may see all of the tasks to be completed associated with the selected facility asset 104.

Figure 13:
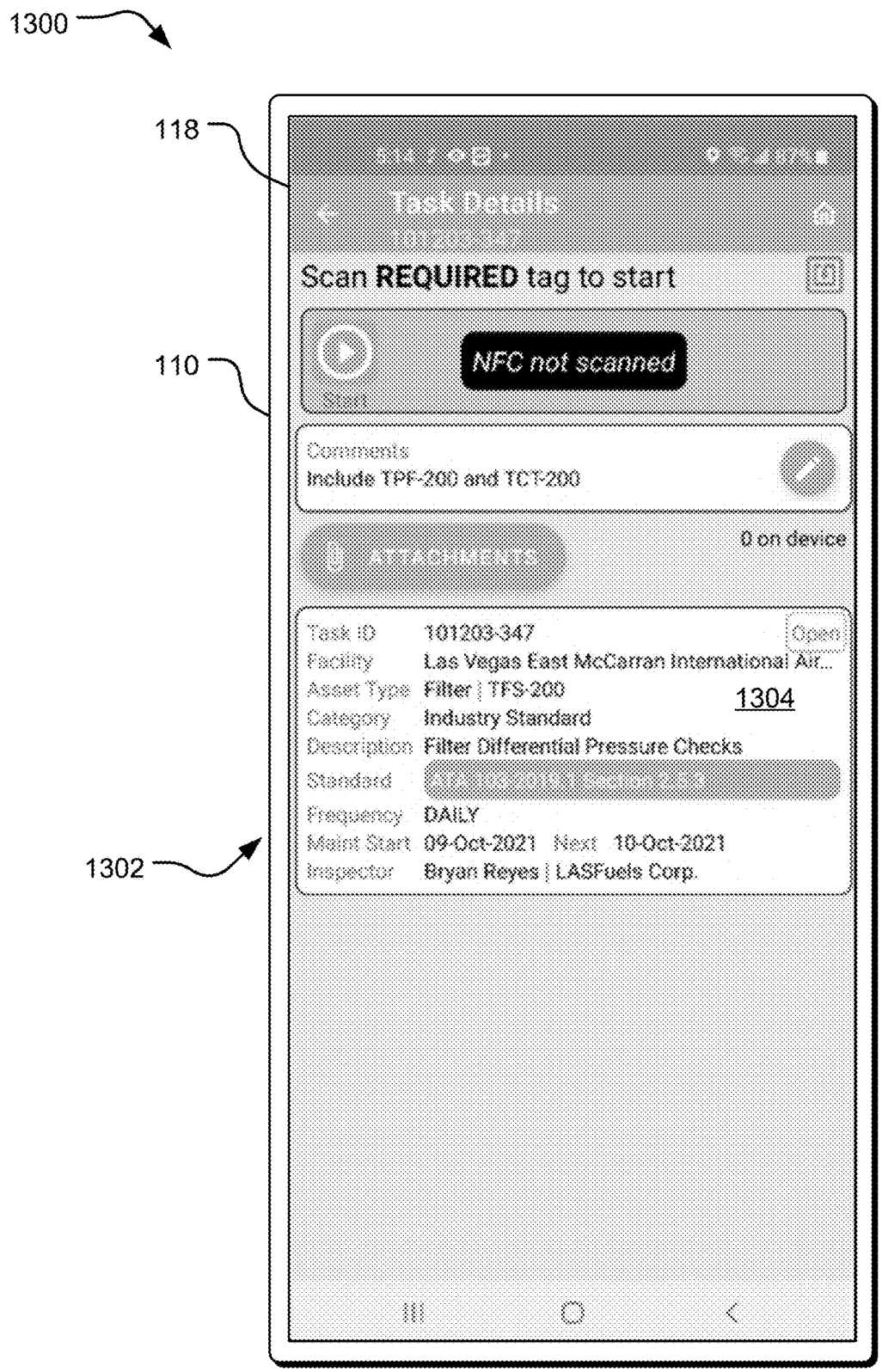
FIG. 13 illustrates an example system for tracking facility assets using a task execution interface at a field device.

FIG. 13 illustrates an example system 1300 for tracking facility assets 104 using the asset tracking platform 102. As depicted in FIG. 13, the system 1300 can include a task execution interface 1302, presented at the field device 110, for performing the asset task with the field device 110. The system 1300 can form at least a part of the system 100 depicted in FIG. 1.

In some examples, the task execution interface 1302 is used to perform the various tasks discussed herein. Performing the task can be initiated by scanning the asset tag 204 at the facility assets 104, which causes a task timer to start to track an amount of time for completing the task. Alternatively, the task execution interface 1302 can include an option for starting the task timer with a manual override via a start button presented at the task execution interface 1302 (e.g., for scenarios where the asset tag 204 is broken or malfunctioning). A warning prompt can be presented at the task execution interface 1302 indicating that the task is being performed with a manual override and requesting an additional input to proceed with performing the task. The asset tracking platform 102 can track and flag tasks performed with the manual override. In response to initiating the task, the asset tracking platform 102 can generate an open task window 1304 at the task execution interface 1302. The open task window 1304 can present the asset data 208 and the task data 210 associated with the initiated task. The task data 210 presented at the open task window 1304 can include a link to a standards data (e.g., a PDF document, a website, a user manual, equipment specifications, additional comments, combinations thereof, and the like). The standards data can include the technical details of any applicable industry standards for the task being performed. The task execution interface 1302 can indicate the task is "in-progress" until the field device UI 118 receives another input indicating that the task has been complete. In some instances, the task timer can be paused and restarted in response to inputs at the task execution interface 1302, or pausing the timer may be locked or unavailable. The task execution interface 1302 can also include a comments section for receiving any notes or comments associated with performing the task. Furthermore, the task execution interface 1302 can include an attachment button for creating an attachment associated with the task.

Figure 14:
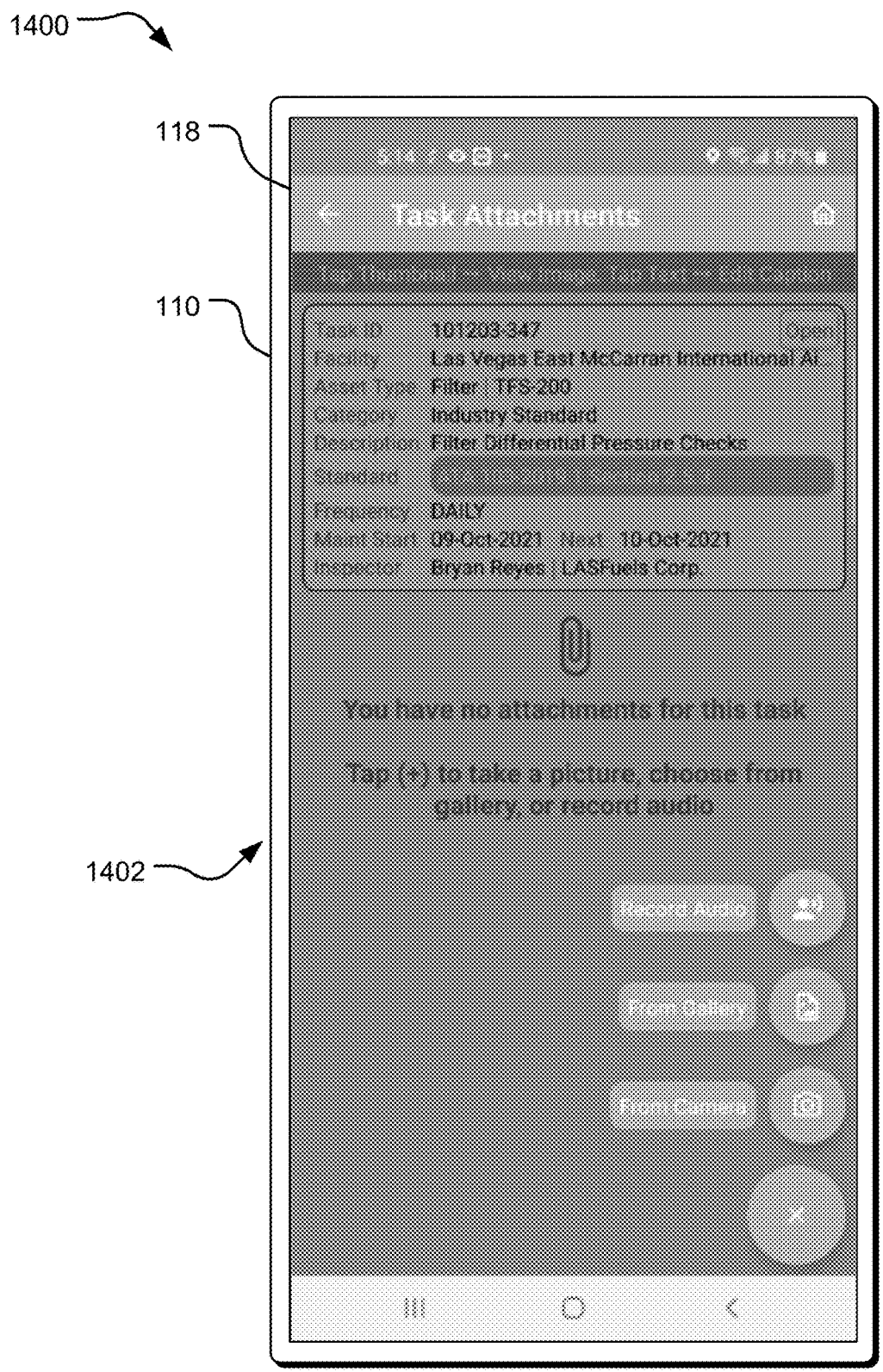
FIG. 14 illustrates an example system for tracking facility assets using a task attachment interface at a field device.

FIG. 14 illustrates an example system 1400 for tracking facility assets 104 using the asset tracking platform 102. As depicted in FIG. 14, the system 1400 can include the task execution interface 1302 with a task attachment interface 1402 for performing the asset task with the field device 110. The system 1400 can form at least a part of the system 100 depicted in FIG. 1. The task attachment interface 1402 can be presented in response to the input at the attachment button of the task execution interface 1302. Field personnel can use the task attachment interface 1402 to take a photo with the camera of the field device(s) 110, select a photo stored in memory of the field device(s) 110, and/or record an audio file. The audio file can be a voice memo that is translated to text to create a hands-free comment or note, which can be useful in scenarios where the field personnel has dirty or greasy hands. The photo and/or audio file can be attached or associated with the task entry being completed.

Furthermore, the asset tracking platform 102 can generate one or more work orders to create unplanned work order tasks for unplanned maintenance outside of the downloaded task list 702. A create work order prompt can be presented in response to receiving an input at a work order button (e.g., as shown in FIG. 4) to create the work order task. The work order prompt can receive asset data 208 and task data 210 associated with the work order and generated by the field personnel manually (e.g., including the facility or operational site name, the asset type, comments or description of the problem, an inspector name, an inspection company, an estimated cost, a priority level, attachments, etc.). Upon creating the work order task, the field device(s) 110 can perform a data syncs 116 (as discussed above) to add the work order task to the workflow data 114. Work order tasks can relate to equipment issues identified by the field personnel while performing other tasks (e.g., a gauge oil leak, the presence of a dangerous animal, and the like). Once the work order task is created, the work order task can be performed using the task execution interface 1302.

Figure 15:
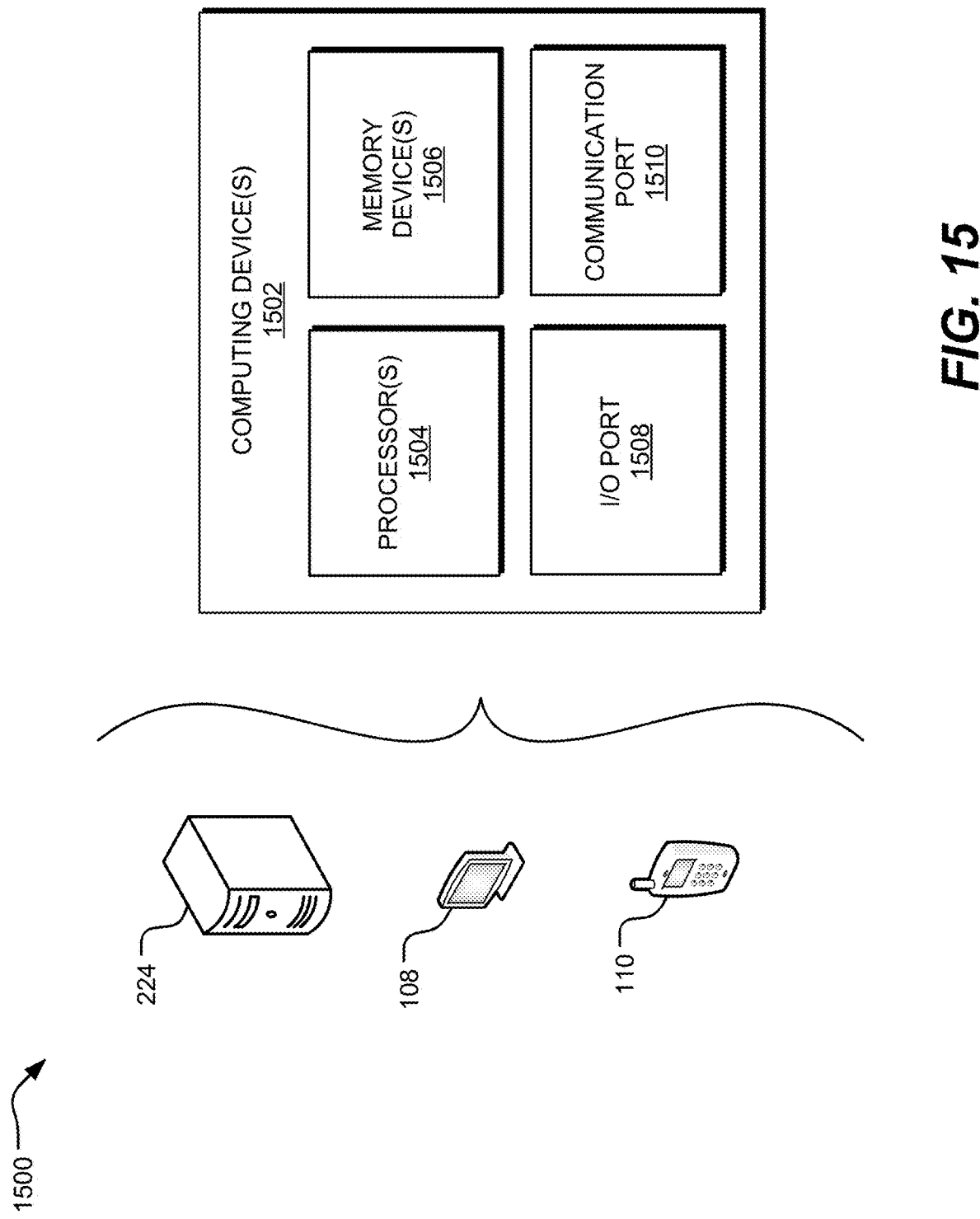
FIG. 15 illustrates an example system for tracking facility assets using one or more computing devices.

FIG. 15 illustrates an example system 1500 for tracking facility assets 104 using one or more computer system(s) 1502, which implement the systems 100-1400 discussed herein. In one implementation, the one or more computing device(s) 1502 include the site operator device 108, the field device(s) 110, and/or the server(s) 224.

In some instances, the computing device(s) 1502 includes a computer, a personal computer, a desktop computer, a laptop computer, a terminal, a workstation, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a virtual reality (VR) or augmented reality (AR) device, and/or the like. The computing device(s) 1502 may be integrated with, form a part of, or otherwise be associated with the systems 100-1400. It will be appreciated that specific implementations of these devices may be of differing possible specific computing architectures not all of which are specifically discussed herein but will be understood by those of ordinary skill in the art.

The computing device 1502 may be a computing system capable of executing a computer program product to execute a computer process. The system 100 can be stored and executed at the computing device 1502 (e.g., as one or more software components). Data and program files may be input to the computing device 1502 (e.g., the workflow data 114, the user inputs, etc.), which can read the data and executes the programs therein to implement the asset tracking platform 102. Some of the elements of the computing device 1502 include one or more hardware processors 1504, one or more memory devices 1506, and/or one or more ports, such as input/output (10) port(s) 1508 and communication port(s) 1510. Additionally, other elements that will be recognized by those skilled in the art may be included in the computing device 1502 but are not explicitly depicted in FIG. 15 or discussed further herein. Various elements of the computing device 1502 may communicate with one another by way of the communication port(s) 1510 and/or one or more communication buses, point-to-point communication paths, or other communication means.

The processor 1504 may include, for example, a central processing unit (CPU), a microprocessor, a microcontroller, a digital signal processor (DSP), and/or one or more internal levels of cache. There may be one or more processors 1504, such that the processor 1504 comprises a single central-processing unit, or a plurality of processing units capable of executing instructions and performing operations in parallel with each other, commonly referred to as a parallel processing environment.

The computing device 1502 may be stand-alone computer, a distributed computer, or any other type of computer, such as one or more external computers made available via a cloud computing architecture. The presently described technology is optionally implemented in software stored on the data storage device(s) such as the memory device(s) 1506, and/or communicated via one or more of the ports 1508 and 1510, thereby transforming the computing device 1502 in FIG. 15 to a special purpose machine for implementing the operations described herein. Moreover, the unconventional arrangement of the one or more computing devices 1502 into the asset tracking platform 102 (e.g., including the site operator device 108, the field device(s) 110, the remote service 128, and the applications and web portals executing thereon) improves the fields of technology of facility asset data tracking and data management.

The one or more memory device(s) 1506 may include any non-volatile data storage device capable of storing data generated or employed within the computing device 1502, such as computer-executable instructions for performing a computer process, which may include instructions of both application programs and an operating system (OS) that manages the various components of the computing device 1502. The memory device(s) 1506 may include, without limitation, magnetic disk drives, optical disk drives, solid state drives (SSDs), flash drives, and the like. The memory device(s) 1506 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 1506 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 1506 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 1502 includes one or more ports, such as the I/O port 1508 and the communication port 1510, for communicating with other computing, network, or vehicle devices. It will be appreciated that the I/O port 1508 and the communication port 1510 may be combined or separate and that more or fewer ports may be included in the computing device 1502.

The I/O port 1508 may be connected to an I/O device, or other device, by which information is input to or output from the computing device 1502. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 1502 via the I/O port 1508. Similarly, the output devices may convert electrical signals received from the computing device 1502 via the I/O port 1508 into signals that may be sensed as output by a human, such as sound, light, and/or touch. The input device may be an alphanumeric input device, including alphanumeric and other keys for communicating information and/or command selections to the processor 1504 via the I/O port 1508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 1510 can connect to the network (e.g., the LAN during the data sync 116 and/or the WAN during the external upload 126, as discussed above) and the computing device 1502 may receive network data useful in executing the methods and systems set out herein as well as transmitting information and network configuration changes determined thereby. Stated differently, the communication port 1510 can connect the different computing devices 1502 disclosed herein to one or more communication interface devices configured to transmit and/or receive information between the computing device(s) 1502 and other computing device(s) 1502 by way of one or more wired or wireless communication networks or connections. Examples of such networks or connections include, without limitation, Universal Serial Bus (USB), Ethernet, Wi-Fi, Bluetooth®, Near Field Communication (NFC), and so on, as discussed above. One or more such communication interface devices may be utilized via the communication port 1510 to communicate one or more other machines, either directly over a point-to-point communication path, mesh networks, or over another communication means. Further, the communication port 1510 may communicate with an antenna or other link for electromagnetic signal transmission and/or reception.

In an example implementation, the system 100 and/or the asset tracking platform 102 may be embodied by instructions stored on the memory devices 1506 and executed by the processor 1504.

The system 1500 set forth in FIG. 15 includes but one possible example of a computing device 1502 that may employ or be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 1502.

Figure 16:
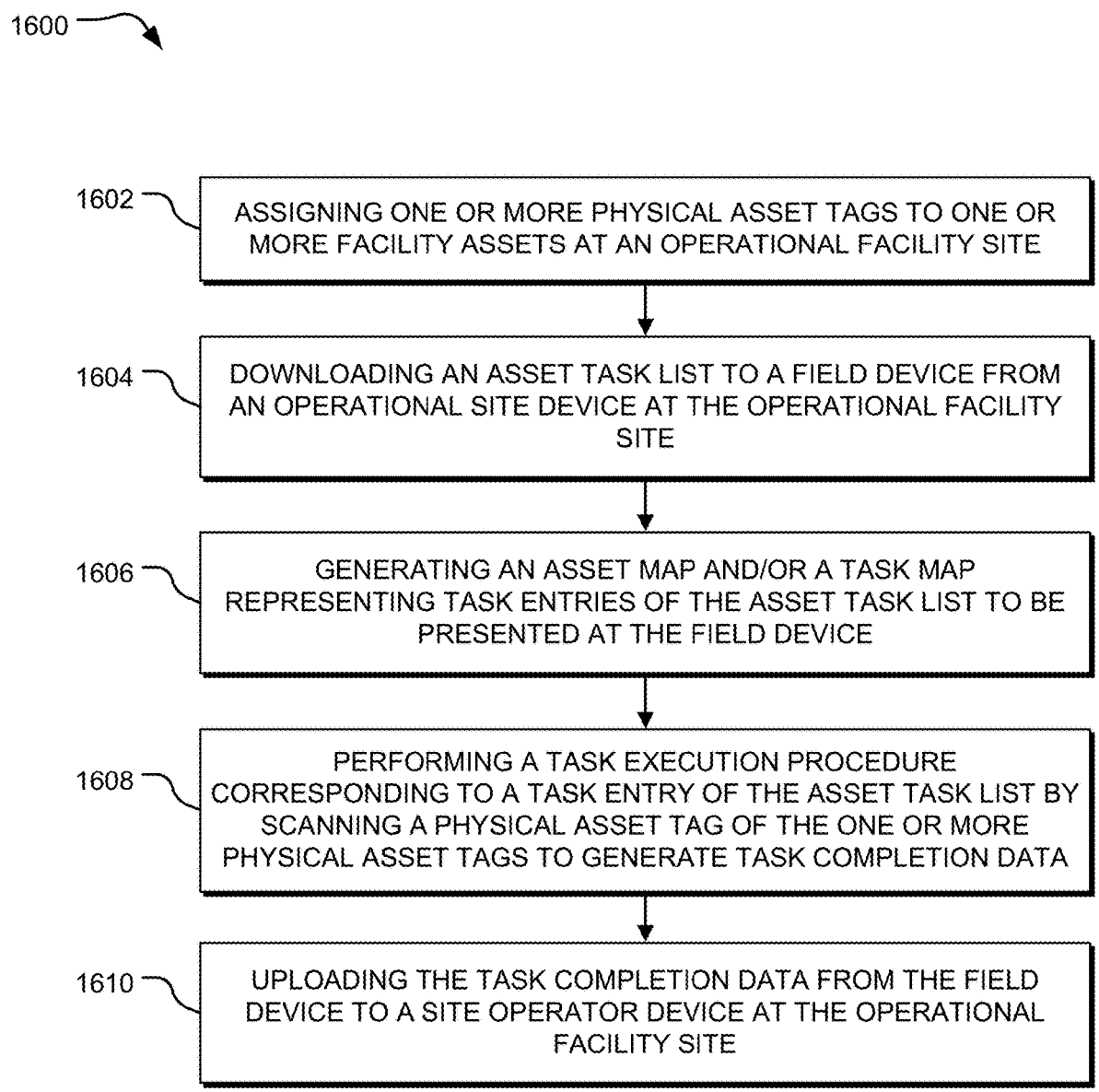
FIG. 16 illustrates an example method for tracking facility assets using an asset tracking platform.

FIG. 16 illustrates an example method 1600 to track facility assets 104 using the asset tracking platform 102, which can be performed by any of the systems 100-1500 disclosed herein.

In some examples, at operation 1602, the method 1600 assigns one or more physical asset tags to one or more facility assets at an operational facility site. At operation 1604, the method 1600 downloads an asset task list to a field device from an operational site device at the operational facility site. At operation 1606, the method generates an asset map and/or a task map representing task entries of the asset task list to be presented at the field device. At operation 1608, the method 1600 performs a task execution procedure corresponding to a task entry of the asset task list by scanning a physical asset tag of the one or more physical asset tags to generate task completion data. At operation 1610, the method 1600 uploads the task completion data from the field device to a site operator device at the operational facility site.

It is to be understood that the specific order or hierarchy of steps in the method(s) depicted in FIG. 16, and throughout this disclosure, are instances of example approaches and can be rearranged while remaining within the disclosed subject matter. For instance, any of the operations depicted in FIG. 16 or throughout this disclosure may be omitted, repeated, performed in parallel, performed in a different order, and/or combined with any other of the operations depicted in FIG. 16 or throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method to track facility assets, the method comprising:
    assigning one or more physical asset tags to one or more facility assets at an operational facility site;
    receiving, at a field device of an asset tracking platform, a download of an asset task list from a site operator device at the operational facility site, the asset task list downloaded by the site operator device from a remote server;
    presenting, via at least one of the field device or the site operator device, a task map, the task map including one or more task identifiers corresponding to one or more task entries of the asset task list, the one or more task identifiers layered over a map image of the operational facility site;
    performing a task execution procedure corresponding to a first task entry of one or more task entries of the asset task list, the task execution procedure includes scanning a physical asset tag of the one or more physical asset tags and generating task completion data; and
    uploading the task completion data from the field device to the site operator device at the operational facility site.

2. The method of claim 1, wherein the one or more physical asset tags include a plurality of visually uniform plastic tags.

3. The method of claim 2, wherein:
    the one or more physical asset tags store one or more unique alphanumeric values using radio-frequency identification (RFID) to identify the one or more facility assets; and
    assigning the one or more physical asset tags to the one or more facility assets includes generating and storing, using the field device, an association between the one or more unique alphanumeric values and location data of the field device.

4. The method of claim 1, further comprising causing the task map corresponding to the asset task list to be presented at the field device with one or more indicators representing the one or more physical asset tags.

5. The method of claim 1, wherein uploading the task completion data from the field device to the site operator device includes establishing a local area connection between the field device and the site operator device that omits reliance on an internet connection.

6. The method of claim 1, further comprising generating a work order for an unplanned task using the field device.

7. The method of claim 6, wherein:
the method further includes adding a second task entry to the asset task list for the unplanned task of the work order; and
uploading the task completion data includes uploading the second task entry to a site operator task list at the site operator device.

8. The method of claim 1, wherein:
the first task entry has an open status in the download of the asset task list;
the open status is changed to a closed status at the field device in respond to performing the task execution procedure; and
uploading the task completion data causes the open status to change to the closed status for the first task entry at the site operator device.

9. The method of claim 1, further comprising:
receiving to a user input at the site operator device instructing the site operator device to upload the task completion data; and
in response to the user input, uploading the task completion data from the site operator device to the remote server.

10. The method of claim 1, wherein the asset task list includes a plurality of task entries with statuses of open, closed, or in-progress.

11. The method of claim 10, further comprising generating a task dashboard at the field device representing the plurality of task entries with the statuses of open, closed, or in-progress.

12. A device for tracking facility assets, the device comprising:
one or more sensors;
a processor; and
a memory storing computer-readable instructions that, when executed by the processor, cause the device to:
generate an assignment of a physical asset tag to a facility asset at an operational facility site using the one or more sensors;
receive a download of an asset task list including one or more asset task entries from a site operator device, the asset task list downloaded by the site operator device from a remote server;
present a task map, the task map including one or more asset task identifiers corresponding to the one or more asset task entries of the asset task list, the one or more asset task identifiers layered over a map image of an operational facility site;
perform one or more task execution procedures corresponding to the one or more asset task entries to generate task completion data; and
upload the task completion data to the site operator device.

13. The device of claim 12, wherein the one or more task execution procedures include:
a first option to scan the physical asset tag; and
a second option to omit scanning the physical asset tag in response to a manual override input.

14. The device of claim 13, wherein the computer-readable instructions, when executed by the processor, further cause the device to:
receive the manual override input; and
include an indication of the manual override input in the task completion data uploaded to the site operator device.

15. The device of claim 13, wherein generating the assignment of the physical asset tag to the facility asset includes associating a tag identifier of the physical asset tag with location data of the device, such that the location data of the device represents a location of the facility asset on an asset map.

16. The device of claim 13, wherein performing the one or more task execution procedures includes:
starting a timer at the device; and
stopping the timer at the device to create a task time associated with the task completion data.

17. The device of claim 13, wherein performing the one or more task execution procedures includes:
creating a text file, an audio file, or an image file using the one or more sensors; and
including the text file, the audio file or the image file in the task completion data uploaded to the site operator device.

18. A device for tracking facility assets, the device comprising:
one or more processor; and
a memory storing computer-readable instructions that, when executed by the one or more processor, cause the device to:
receive, via a download from a remote service, a site operator task list including a plurality of asset task entries for facility assets represented by physical asset tag identifiers;
send, to a field device, an asset task list including one or more asset task entries of the plurality of asset task entries;
present a task map, the task map including one or more asset task identifiers corresponding to the one or more asset task entries of the asset task list, the one or more asset task identifiers layered over a map image of an operational facility site; and
receive, from the field device, task completion data representing one or more task execution procedures performed for the one or more asset task entries of the asset task list sent to the field device.

19. The device of claim 18, wherein the one or more asset task entries of the asset task list have an open status and a task completion deadline date corresponding to a download date of the asset task list.

20. The device of claim 18, wherein the computer-readable instructions, when executed by the one or more processor, further cause the device to:
determine, based at least partly on the task completion data, an average amount of work hours associated with a type of task or a type of equipment; and
cause an indication of the average amount of work hours to be presented at a user interface.

* * * * *